United States Patent
Yamagaki

(10) Patent No.: US 8,725,671 B2
(45) Date of Patent: May 13, 2014

(54) PATTERN MATCHING APPRATUS

(75) Inventor: Norio Yamagaki, Tokyo (JP)

(73) Assignee: NEC Corporation, Tokyo (JP)

(*) Notice: Subject to any disclaimer, the term of this patent is extended or adjusted under 35 U.S.C. 154(b) by 242 days.

(21) Appl. No.: 13/138,668

(22) PCT Filed: Mar. 19, 2010

(86) PCT No.: PCT/JP2010/054807
§ 371 (c)(1), (2), (4) Date: Sep. 16, 2011

(87) PCT Pub. No.: WO2010/107114
PCT Pub. Date: Sep. 23, 2010

(65) Prior Publication Data
US 2012/0011094 A1    Jan. 12, 2012

(30) Foreign Application Priority Data

Mar. 19, 2009  (JP) ................. 2009-068011

(51) Int. Cl.
G06N 5/00 (2006.01)
G06F 17/00 (2006.01)

(52) U.S. Cl.
USPC .......................................................... 706/45

(58) Field of Classification Search
None
See application file for complete search history.

(56) References Cited

U.S. PATENT DOCUMENTS 7,119,577 B2   10/2006  Sharangpani
2010/0325157 A1  12/2010  Yamagaki et al.

FOREIGN PATENT DOCUMENTS

JP       2005-537550 A       12/2005
WO    WO 2008/081932 A1    7/2008
WO    WO 2009/147794 A1   12/2009

OTHER PUBLICATIONS

Aho, Lam, Sethi, Ullman, "Compilers, Principles, Techniques & Tools", Pearson Education, INc., New York, 2007, pp. 59 and 70.*
Wegener, "BDD—Design, Analysis, Complexity and Applications", Discrete Applied Mathematics, vol. 138, 2004, pp. 229-251.*
Cong, Ding, "Combinational Logic Synthesis for LUT Based Field Programmable Gate Arrays", ACM Transactions on Design Automation of Electronic Systems (TODAES), vol. 1 Issue 2, Apr. 1996, pp. 145-204.*
Mitra, Najjar, Bhuyan, "Compiling PCRE to FPGA for Accelerating SNORT IDS", ACM/IEEE Symposium on Architectures for Networking and Communications Systems, Orlando, FL, Dec. 2007, pp. 1-9.*
International Search Report (ISR) (PCT Form PCT/ISA/210) dated Jun. 1, 2010, previously filed on Sep. 16, 2011.
Yoshiyuki Kondo, "The Standard Text: Algorithm and Data Structure for C-programmer", SoftBank Publishing, 1998, pp. 297-330.
Reetinder Sidhu, et al.,"Fast Regular Expression Matching using FPGAs", Proceedings of the 9th Annual IEEE Symposium on Field-Programmable Custom Computing Machines, 2001, pp. 227-238.

(Continued)

Primary Examiner — Kakali Chaki
Assistant Examiner — Walter Hanchak
(74) Attorney, Agent, or Firm — McGinn I.P. Law Group, PLLC

(57) ABSTRACT

According to an automaton circuit, a pattern matching apparatus, and a pattern matching method of the present invention, by converting regular expressions into configuration data with the certain format, the regular expression, which can be expressed by using only 3 kinds of metacharacters and can be expressed within a certain length, can be input. Since connection relations inside the automaton circuit are changed depending on the configuration data, the automaton circuit according to the present invention is reconfigurable.

26 Claims, 18 Drawing Sheets

(56) References Cited

OTHER PUBLICATIONS

Divyasree J, et al.,"Dynamically Reconfigurable Regular Expression Matching Architecture", Proceedings of the 19th IEEE International Conference on Application-Specific Systems, Architectures and Processors, 2008, pp. 120-125.

Reetinder Sidhu, "Efficient Computation Using Self-Reconfiguration", University of Southern California, Doctoral dissertation (PhD Thesis), 2005, pp. 159-162.

Norio Yamagaki, et al., "A Study on Multibyte Processing for NFA-based Pattern Matching Circuits", IEICE Technical Report, Sep. 13, 2007, vol. 107, No. 225, pp. 65 to 70.

\* cited by examiner

PATTERN MATCHING APPRATUS

TECHNICAL FIELD

The present invention relates to an automaton circuit, a pattern matching (string matching) apparatus using the circuit and a pattern matching method using the apparatus. More particularly, the present invention relates to a finite automaton circuit which can reconfigure a regular expression, a pattern matching (string matching) apparatus using the circuit and a pattern matching method using the apparatus.

BACKGROUND ART

The regular expression is a notation which expresses an arbitrary string as a pattern by combining normal characters and particular characters having special meanings so-called metacharacters.

The string matching (pattern matching) using the regular expression is applied to various kinds of fields. For example, it is used for a string search from a certain document file, a search of a specific string from packet payloads in a network in a network security field and the like.

Recently, network bandwidths have been drastically increased. Therefore, particularly, in a network, when a pattern matching is performed in packet payloads and the like using a regular expression, it should be implemented with high search throughput adapted to a network bandwidth.

Generally, in a microprocessor, a pattern matching using a regular expression is implemented using a NFA (Non-deterministic Finite Automaton) or a DFA (Deterministic Finite Automaton) which is created from a given search target pattern of a regular expression.

A conversion method from a regular expression into a NFA or a DFA is, for example, disclosed in a non-patent literature 1 (Yoshiyuki Kondo, "The Standard Text: Algorithm and Data Structure for C-programmer", SoftBank Publishing, 1998, pp. 297-330). The non-patent literature 1 discloses that a regular expression is converted into a syntax tree, a NFA is created from the syntax tree, and then, a DFA is created from the NFA.

FIG. 1 shows an example of the syntax tree of "a(bc)*(d|e) f" using the regular expression. FIG. 2 shows an example of the NFA obtained by converting the syntax tree of "a(bc)* (d|e) f" using the regular expression. Here, the NFA of FIG. 2 is an example of the NFA not including a $\epsilon$ transition (epsilon-transition). The $\epsilon$ transition is a particular transition in which a transition can be carried out without having any input.

In the DFA in which there is only one destination of a state transition for input characters in a certain state, a pattern matching can be implemented in a constant speed per character, namely, in a processing time O(1). Therefore, for an input stream (a search target string) with a length of m, the processing time O(m) is required. There is a concern that, for a length n of the regular expression, the number of states of the DFA increases to the O(2$^n$) in the worst case. Therefore, there is a possibility that the memory amount for requiring to hold the states increases explosively. This is also pointed out in a patent literature 1 (JP-P 2005-537550 A), the non-patent literature 1 and a non-patent literature 2 (Reetinder Sidhu, Viktor K. Prasanna, "Fast Regular Expression Matching using FPGAs", Proceedings of the 9th Annual IEEE Symposium on Field-Programmable Custom Computing Machines, 2001, pp. 227-238).

On the other hand, in the NFA, there is a case that a plurality of destinations of a state transition for input characters in a certain state. In this case, in a microprocessor which executes a serial processing, the NFA implements a pattern matching in a processing time O(n) per character. Here, the n is the length of the regular expression. Therefore, for the input stream with the length of m, the processing time O(mn) is required. However, the number of states increases to the O(n) which is smaller than that of the DFA.

Recently, for example, in the non-patent literature 2, a method for a high speed pattern matching is proposed which makes the NFA be an actual circuit to be embedded to a reconfigurable device such as a FPGA (Field Programmable Gate Array).

FIG. 3 is a circuit diagram of a basic block used for making the NFA be an actual circuit in the non-patent literature 2. This unit circuit includes: a Flip-Flop (F/F) 502, a comparator 602 and an AND gate 803. The Flip-Flop 502 is for configuring each state of the NFA. The comparator 602 is for comparing a character of a transition condition from the state with an input text character. The AND gate 803 is for creating a state transition signal based on the output of the Flip-Flop and the output of the comparator.

According to the non-patent literature 2, by providing with a plurality of the unit blocks having such configurations, arranging the plurality of the unit blocks appropriately and further connecting a combinational circuit such as an AND gate, an OR gate and the like, the target NFA is made to be the actual circuit.

FIG. 4 is a circuit diagram of the pattern matching circuit corresponding to the "a(bc)*(d|e)f" using the regular expression according to the non-patent literature 2. In this method, by taking advantages of parallel processing features using hardware, while the number of states of the NFA maintains the O(n), the processing time per character can be reduced to the O(1) similar to that of the DFA. Therefore, for the input stream with the length m, the pattern matching can be carried out in the processing time of the O(m).

On the other hand, in the above method, when the revision of the pattern of the regular expression embedded to the FPGA is performed by changing, adding, deleting and the like, a reconfiguration processing (hereinafter referred to as compiling of FPGA) such as a correction and/or a synthesis of a HDL (Hardware Description Language) like a verilog-HDL and a VHDL (Very high-speed integrated circuit Hardware Description Language), a PAR (Place and Route) and/or a programming for the FPGA is required. Consequently, even if one pattern is desired to be revised, a processing of a whole system including the FPGA should be stopped during the reconfiguration. In addition, based on the reason mentioned above, there is a problem that it is not suitable to be configured using an ASIC (Application Specific Integrated Circuit) for an actual dedicated circuit.

In order to solve the above mentioned problem, a circuit architecture is proposed in a non-patent literature 3 (Divyasree J, Rajashekar H, Kuruvilla Varghese, "Dynamically Reconfigurable Regular Expression Matching Architecture", Proceedings of the 19th IEEE International Conference on Application-Specific Systems, Architectures and Processors, 2008, pp. 120-125) and the patent literature 1.

The method shown in the non-patent literature 3, similar to that shown in the non-patent literature 2, by providing with a plurality of unit blocks (called a basic block in the non-patent literature 3), a state of the NFA is made to be the actual circuit. Here, the circuit of the non-patent literature 3 is slightly different from that of the non-patent literature 2 in the connection relation of the output signals and the like from the Flip-Flop and the comparator.

In addition, the non-patent literature 3 proposes an architecture including generic blocks, each of which includes: an 8 bits counter realizing a CR(Constrained Repetition) of the certain number of times such as "R{n}" of the regular expression (n times repetition of R of the regular expression), "R{n, m}" of the regular expression (equal to or more than n and equal to or less than m times repetition of R of the regular expression) and the like; a count decoder judging the number of times of the CR; and a MUX (MUltipleXer) selecting multiple signal lines. The generic blocks are arranged in line like an array shape and are connected to respective input and output signals.

This architecture is supposed to be configured on the FPGA. In addition, the operation of each of the MUX and the count decoder in each generic block is determined by changing a content of an LUT (Look-Up Table) composed of a memory (SRAM: Static Random Access Memory) which determines a circuit configuration of the FPGA.

In the non-patent literature 3, the FPGA produced by the Xilinx Incorporated is supposed. The content of the LUT is supposed to be changed by using a SRL (Shift Register LUT). However, by providing a register and a memory corresponding to the SRL, it is considered to be configured using the ASIC.

In this method, as described above, the operation of the MUX configured in the generic block implemented on the FPGA is changed. This makes it possible to realize a dynamic reconfiguration which configures the regular expression without compiling the FPGA.

In this architecture, the generic blocks are connected in line like an array shape. In addition, there is only one feedback signal from a certain generic block to a previous generic block. Consequently, in this architecture, there is a problem that the regular expressions which can be configured are limited. For example, the regular expression such as "a(bcd)*e" can be configured. However, the regular expression in which a metacharacter exists in a nest such as "a(b+cd)*e" cannot be configured.

In addition, the patent literature 1 discloses a reconfigurable NFA circuit architecture in which a connection configuration and a state transition condition can be reconfigured bated on values set in a register array. This architecture is supposed to be configured using the ASIC. However, as similar to the above-mentioned architecture, it can be configured using the FPGA.

The architecture in the patent literature 1 is provided with: register arrays having functions of the states of the NFA; and wiring lines from each register indicating the state to all registers indicating respective states. In addition, it is provided with register arrays for setting connections between the states. Based on a configuration of switches using values set in the registers, the connections between the registers indicating the states can be set. Further, it is provided with register groups for setting state transition information from respective states to the transition destinations. For example, when a transition is carried out using a character of the regular expression, a character of the transition condition is set at the corresponding positions in the register group. The set value is compared with an input text character. If the set value matches the character, a logical AND is carried out between a signal indicating the matching result and a signal as the corresponding transition condition to establish the state transition. In this method, by rewriting both of the register arrays in which the connection information (switches) between the states is set and the register groups in which the state transition information is set, the NFA which is expressed by the desired regular expression can be dynamically reconfigured.

This architecture can dynamically configure all of the NFA. On the other hand, for the general-purpose, wiring lines of respective states are prepared. Therefore, the number of the wiring lines, the number of the register arrays setting the connection information (switches) between the states and the number of the register groups setting the state transition information are increased at a rate of $O(N^2)$. That is, there is a problem in the scalability with respect to the number of states.

In summary, the circuit architecture which can reconfigure the NFA indicating the regular expression and the general-purpose NFA as mentioned above have following problems.

The first problem appears in the reconfigurable NFA circuit in which the blocks (modules) capable of partially configuring the specific regular expression are connected in one-dimensional array shape. In this reconfigurable NFA circuit, for example, the regular expression in which a metacharacter exists in a nest such as "a(b+cd)*e" cannot be configured. That is, the first problem is that there are limiting conditions for configuring the regular expression.

The reason is that the blocks (modules) (generic block in the non-patent literature 3) capable of partially configuring the specific regular expression are connected in one-dimensional array shape, and therefore the limiting conditions for configuring the regular expression arises. This is because there is only one feedback signal from the certain block to the previous block. In addition, this is because the number of signals which is made to pass through the later stage blocks is limited, when there are multiple signals to be directly connected to a several blocks away.

The second problem appears in the architecture, which is provided with the wiring lines from each register indicating the state to all registers and can dynamically reconfigure the NFA by reconfiguring the connection configuration between the states and the state transition condition using the set values in the register array. This architecture can configure all of the NFA having whatever transition. On the other hand, the amount of hardware is increased at a rate of $O(N^2)$ with respect to the number of states: N. Thus, the second problem is that there is a problem in the scalability with respect to the number of states.

The reason is that the architecture is the circuit which can configure the general-purpose NFA. That is, all wiring lines of respective states, the register arrays setting the connection information (switches) between the states, and the register groups setting the state transition information is required to be prepared.

As another technique, a non-patent literature 4 (Reetinder Sidhu, "Efficient Computation Using Self-Reconfiguration", University of Southern California, Doctoral dissertation (PhD Thesis), 2005, pp. 159-162) discloses "The layout of an arbitrary binary tree t of size (the number of nodes) n (n>0) can be performed in n×(layers(t)+1) cells" and "If t is a binary tree of size (the number of nodes) $2^n-1$ (n>1), then layers(t) is at most n−1". These lead to "The layout of an arbitrary binary tree t of size (the number of nodes) $2^n-1$ (n>1) can be performed in at most $(2^n-1)\times n$ cells."

CITATION LIST

Patent Literature

[PTL 1] JP-P 2005-537550 A

Non Patent Literature

[NPL 1] Yoshiyuki Kondo, "The Standard Text: Algorithm and Data Structure for C-programmer", SoftBank Publishing, 1998, pp. 297-330.

[NPL 2] Reetinder Sidhu, Viktor K. Prasanna, "Fast Regular Expression Matching using FPGAs", Proceedings of the 9th Annual IEEE Symposium on Field-Programmable Custom Computing Machines, 2001, pp. 227-238.

[NPL 3] Divyasree J, Rajashekar H, Kuruvilla Varghese, "Dynamically Reconfigurable Regular Expression Matching Architecture", Proceedings of the 19th IEEE International Conference on Application-Specific Systems, Architectures and Processors, 2008, pp. 120-125.

[NPL 4] Reetinder Sidhu, "Efficient Computation Using Self-Reconfiguration", University of Southern California, Doctoral dissertation (PhD Thesis), 2005, pp. 159-162.

SUMMARY OF INVENTION

An object of the present invention is to provide an automaton circuit in which the regular expressions to be configured are less limited, a pattern matching apparatus using the circuit, and a pattern matching method using the apparatus.

A pattern matching apparatus according to the present invention includes: a configuration controller and an automaton circuit. Here, the configuration controller configures configuration data with a certain format, which corresponds to an arbitrary regular expression combining characters as text characters and metacharacters having certain functional meanings, to an automaton circuit. The automaton circuit is used for carrying out pattern matching to the regular expression by performing configuration corresponding to the regular expression based on the configuration data. Here, this configuration is reconfigurable. The automaton circuit includes: character node circuit sections, metacharacter node circuit sections and switch node circuit sections. Here, the character node circuit sections store data corresponding to characters of the regular expression. The metacharacter node circuit sections store data corresponding to metacharacters of the regular expression and configure connection relations to the character node circuit sections. In addition, the metacharacter node circuit sections configure connection relations to the other metacharacter node circuit sections. The switch node circuit sections configure connection relations between metacharacter node circuit sections.

A pattern matching method according to the present invention includes: (a) creating configuration data with a certain format, which corresponds to an arbitrary regular expression combining characters as text characters and metacharacters having certain functional meanings; (b) performing configuration corresponding to the regular expression to an automaton circuit based on the configuration data; and (c) carrying out pattern matching using the automaton circuit. Here, the configuration of the step (b) is reconfigurable. The step (b) includes: (b-1) storing data corresponding to characters of the regular expression in character node circuit sections of the automaton circuit, (b-2) storing data corresponding to metacharacters of the regular expression and configuring connection relations to the character nodes or the other metacharacter nodes in metacharacter node circuit sections of the automaton circuit, and (b-3) configuring connection relations between the metacharacter nodes in a switch node circuit section of the automaton circuit.

According to the automaton circuit, the pattern matching apparatus, and pattern matching method of the present invention, by converting the regular expressions into the configuration data with the certain format, the regular expression satisfying a condition described below can be inputted. That is, the regular expression can be expressed by using only 3 kinds of metacharacters of "|", "*", "·". In addition, the regular expression can be expressed under the condition that the total amount of included text characters and metacharacters is within a length depending on the total amount of char_nodes and mchar_nodes in a single generic logic in the automaton circuit. Since the connection relations inside the automaton circuit are changed depending on the configuration data, the automaton circuit according to the present invention is reconfigurable.

BRIEF DESCRIPTION OF DRAWINGS

The above and other objects, advantages and features of the present invention will be more apparent from the following description of certain preferred exemplary embodiments taken in conjunction with the accompanying drawings, in which.

DESCRIPTION OF EXEMPLARY EMBODIMENTS

Exemplary embodiments of an automaton circuit, a pattern matching apparatus using the automaton circuit and a pattern matching method using the apparatus according to the present invention will be described below referring to the accompanying drawings.

(First Exemplary Embodiment)

Figure 5:
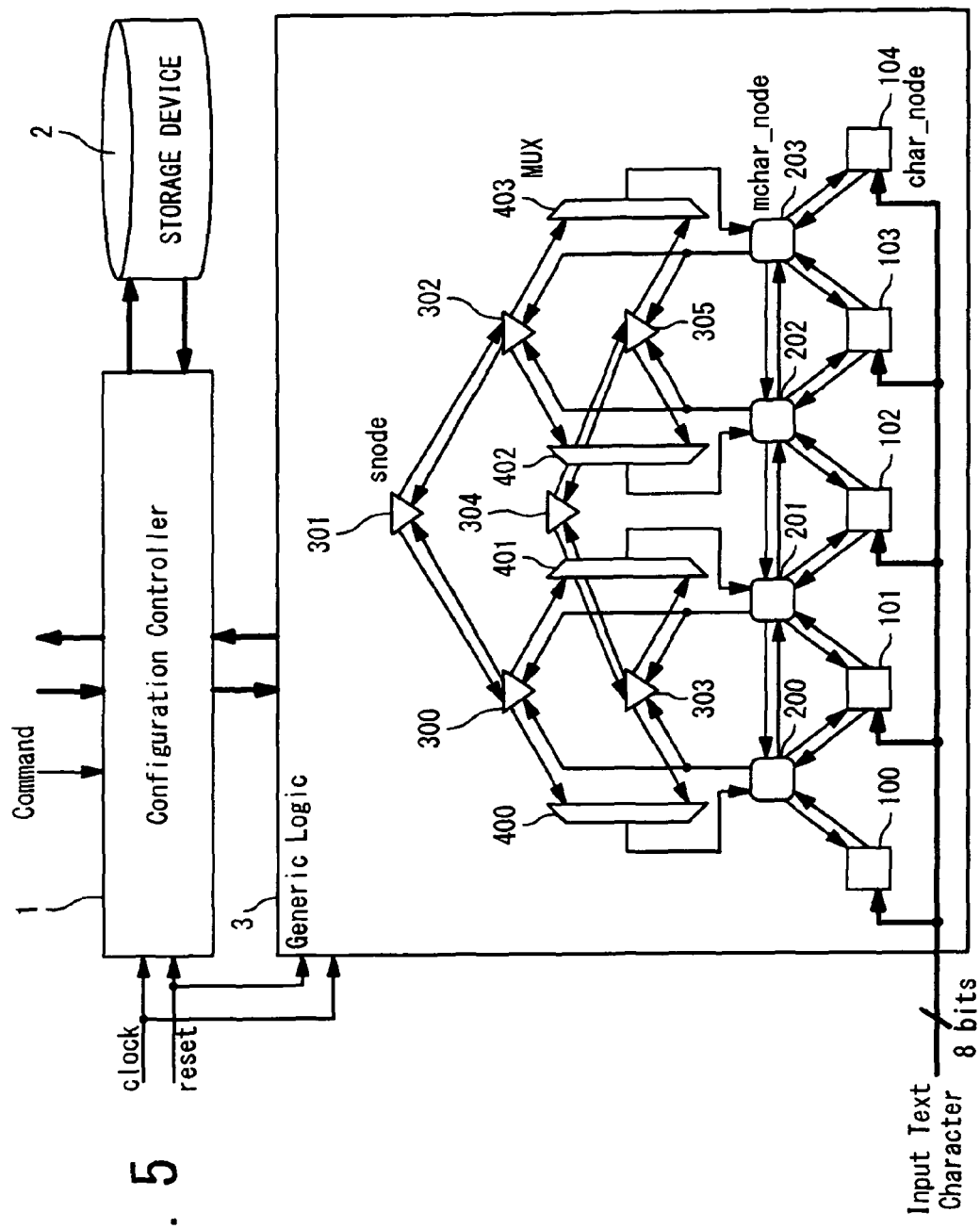
FIG. 5 is a block diagram describing a structure of a pattern matching apparatus according to the first exemplary embodiment of the present invention.

FIG. 5 is a block diagram describing a structure of a pattern matching apparatus according to the first exemplary embodiment of the present invention. The pattern matching apparatus according to the present exemplary embodiment includes: a configuration controller 1, a storage device 2 and a generic logic 3. The configuration controller 1 is a configuration control circuit which configures an arbitrary regular expression able to be expressed using a syntax tree by rewriting set values in configuration registers or configuration memories arranged inside the generic logic 3, the generic logic 3 being a hardware circuit constituting a NFA. The storage device 2 stores configuration data for configuring. The generic logic 3 is a reconfigurable finite automaton circuit which constitutes an arbitrary regular expression able to be expressed using a syntax tree transmitted as the configuration data.

The configuration controller 1 is connected to both of the storage device 2 and the generic logic 3.

In FIG. 5, only one generic logic, which can constitute one finite automaton, is shown. However, the pattern matching apparatus according to the present exemplary embodiment is not limited to this structure. That is, the pattern matching apparatus according to the present exemplary embodiment can include a plurality of the generic logics. In addition, the configuration of each generic logic can be changed by the configuration controller 1.

In addition, in the pattern matching apparatus according to the present exemplary embodiment, a clock signal (clock) for controlling an operation of the apparatus, a reset signal (reset) for initializing the finite automaton and the like, and an additional control signal for indicating an evaluation result are used further.

The storage device 2 includes a storage medium such as a memory. The storage device 2 memorizes or outputs configuration data in response to control signals from the configuration controller 1.

The configuration controller 1 determines an operation based on a command signal (Command) from outside. Operation functions of the configuration controller 1 are as follows.

(1) making the storage device 2 memorize the configuration data supplied from outside.

(2) configuring the configuration data supplied from outside directly to the generic logic.

(3) reading the configuration data stored in the storage device 2 and configuring to the generic logic.

(4) reading the configuration data stored in the storage device 2 and outputting to outside.

(5) reading the configuration data stored in the storage device 2, configuring to the generic logic and outputting to outside.

(6) reading the configuration data configured to the generic logic and outputting to outside.

The command signal from outside includes an operation control signal indicating which of the six operation functions of the configuration controller 1 shown above should be carried out and a timing signal indicating a start of the operation. When the apparatus includes a plurality of the generic logics, the command signal includes a specification control information indicating which of the generic logics the operation should be carried out to.

The configuration controller 1 is carried out a control such as to store the configuration data in a certain address area of the storage device 2 in response to the command signal, and to read the configuration data stored in a certain address area.

The generic logic 3 is a reconfigurable finite automaton circuit which constitutes a finite automaton expressing a specific regular expression using the configuration data configured by the configuration controller 1. The pattern matching using the regular expression is performed on a string supplied to this circuit. The string is supplied with one character (=8 bits) per clock cycle.

Figure 6:
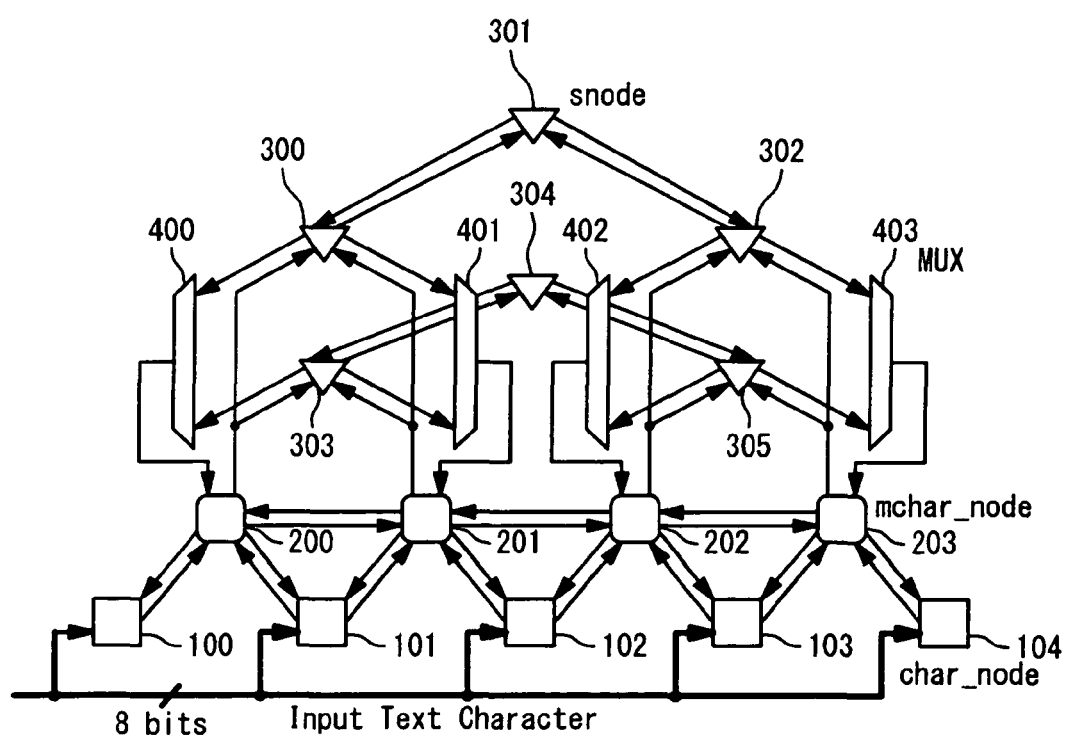
FIG. 6 is a block diagram describing a structure of a generic logic according to the first exemplary embodiment of the present invention.

FIG. 6 is a block diagram describing a structure of the generic logic according to the present exemplary embodiment. The generic logic of FIG. 6 includes character nodes (char_nodes) 100 to 104, metacharacter nodes (mchar_nodes) 200 to 203, 3-input-3-output switch nodes (snode) 300 to 305 and multiplexers (MUXs) 400 to 403. Here, each of the char_nodes 100 to 104 corresponds to a text character of the regular expression. Each of the mchar_nodes 200 to 203 corresponds to a metacharacter.

Here, the connection relation among the char_nodes 100 to 104, the mchar_nodes 200 to 203, the snodes 300 to 305 and the MUXs 400 to 403.

The first output section of the snode 301 is connected to the first input section of the snode 300. The second output section of the snode 301 is connected to the first input section of the snode 302.

The first output section of the snode 300 is connected to the first input section of the snode 301. The second output section of the snode 300 is connected to the first input section of the MUX 400. The third output section of the snode 300 is connected to the first input section of the MUX 401.

The first output section of the snode 302 is connected to the second input section of the snode 301. The second output section of the snode 302 is connected to the first input section of the MUX 402. The third output section of the snode 302 is connected to the first input section of the MUX 403.

The first output section of the snode 304 is connected to the first input section of the snode 303. The second output section of the snode 304 is connected to the first input section of the snode 305.

The first output section of the snode 303 is connected to the first input section of the snode 304. The second output section of the snode 303 is connected to the second input section of the MUX 400. The third output section of the snode 303 is connected to the second input section of the MUX 401.

The first output section of the snode 305 is connected to the second input section of the snode 304. The second output section of the snode 305 is connected to the second input section of the MUX 402. The third output section of the snode 305 is connected to the second input section of the MUX 403.

The output section of the MUX 400 is connected to the first input section of the mchar_node 200.

The output section of the MUX 401 is connected to the first input section of the mchar_node 201.

The output section of the MUX 402 is connected to the first input section of the mchar_node 202.

The output section of the MUX 403 is connected to the first input section of the mchar_node 203.

The first output section of the mchar_node 200 is connected to the second input section of the snode 300 and the second input section of the snode 303. The second output section of the mchar_node 200 is connected to the first input section of the char_node 100. The third output section of the mchar_node 200 is connected to the first input section of the char_node 101. The fourth output section of the mchar_node 200 is connected to the second input section of the mchar_node 201.

The first output section of the mchar_node 201 is connected to the third input section of the snode 300 and the third input section of the snode 303. The second output section of the mchar_node 201 is connected to the second input section of the char_node 101. The third output section of the mchar_node 201 is connected to the first input section of the char_node 102. The fourth output section of the mchar_node 201 is connected to the second input section of the mchar_node 200. The fifth output section of the mchar_node 201 is connected to the second input section of the mchar_node 202.

The first output section of the mchar_node 202 is connected to the second input section of the snode 302 and the second input section of the snode 305. The second output section of the mchar_node 202 is connected to the second input section of the char_node 102. The third output section of the mchar_node 202 is connected to the first input section of the char_node 103. The fourth output section of the mchar_node 202 is connected to the third input section of the mchar_node 201. The fifth output section of the mchar_node 202 is connected to the second input section of the mchar_node 203.

The first output section of the mchar_node 203 is connected to the third input section of the snode 302 and the third input section of the snode 305. The second output section of the mchar_node 203 is connected to the second input section of the char_node 103. The third output section of the mchar_node 203 is connected to the first input section of the char_node 104. The fourth output section of the mchar_node 203 is connected to the third input section of the mchar_node 202.

The output section of the char_node 100 is connected to the third input section of the mchar_node 200.

The first output section of the char_node 101 is connected to the fourth input section of the mchar_node 200. The second output section of the char_node 101 is connected to the fourth input section of the mchar_node 201.

The first output section of the char_node 102 is connected to the fifth input section of the mchar_node 201. The second output section of the char_node 102 is connected to the fourth input section of the mchar_node 202.

The first output section of the char_node 103 is connected to the fifth input section of the mchar_node 202. The second output section of the char_node 103 is connected to the third input section of the mchar_node 203.

The output section of the char_node 104 is connected to the fourth input section of the mchar_node 203.

Figure 1:
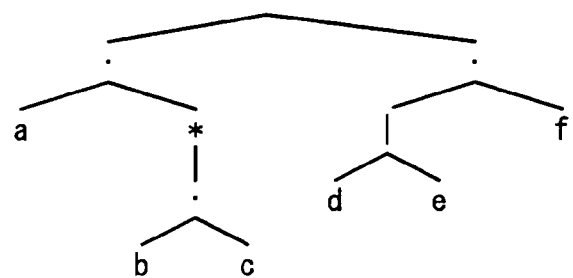
FIG. 1 shows an example of a syntax tree of "a(bc)*(d|e)f" using a regular expression.
Figure 2:
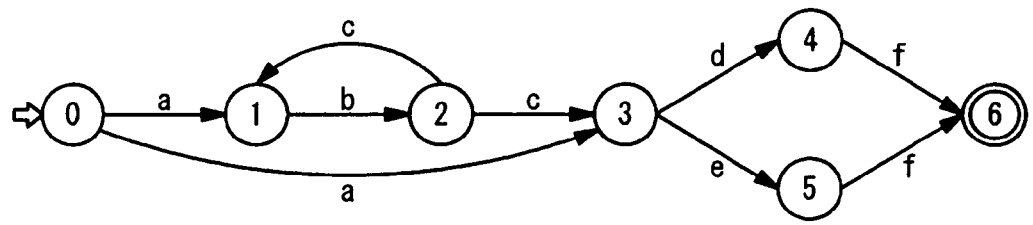
FIG. 2 shows an example of a NFA obtained by converting the syntax tree of "a(bc)*(d|e)f" using the regular expression.

In other words, the generic logic according to the present invention has a configuration in which a plurality (two in FIG. 2) of binary trees including the mchar_nodes as leaf nodes and the snodes as nodes which are not leaf nodes are provided. Specifically, the mchar_nodes as leaf nodes are shared with respective binary trees, and the MUXs have functions for shard use of the leaf nodes among the plurality of binary trees.

The generic logic in FIG. 6 is a finite automaton circuit which can configure the regular expression having a configuration with text characters and metacharacters, the number of text characters being equal to or less than 5 and the number of metacharacters being equal to or less than 4. The generic logic in FIG. 6 includes two binary trees. Here, the first binary tree includes the snode 301 as a root node, the snodes 300 and 302 and the mchar_nodes 200 to 203. In addition, the second binary tree includes the snode 304 as a root node, the snodes 303 and 305 and the mchar_nodes 200 to 203.

A generic logic can be configured, which can configure the regular expression with more text characters and more metacharacters. That is, the generic logic according to the present exemplary embodiment may includes the char_nodes and the mchar_nodes, the number of the char_nodes and the number of the mchar_nodes being different from those of the example of FIG. 6. In this case, the number of MUXs is varied as similar as the number of the mchar_nodes. In addition, the total number of the snodes is varied corresponding to the number of MUXs. The number of stages of the snodes, which are connected in the multiple-stage manner, is varied corresponding to the total number of the snodes. The configuring method will be described later.

Figure 7:
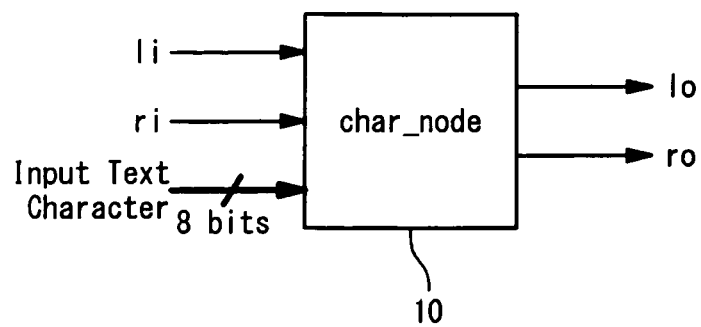
FIG. 7 is a block diagram describing input and output sections of a char_node according to the present invention.

FIG. 7 is a block diagram describing input and output sections of the char_node according to the present invention. This char_node 10 includes a li signal input section, a ri signal input section, a text character input section, a lo signal output section and a ro signal output section.

Here, the signal li is an input signal with 1 bit supplied from the mchar_node adjacent to the left of the char_node. The signal ri is an input signal with 1 bit supplied from the mchar_node adjacent to the right of the char_node. The signal lo is an output signal with 1 bit output to the mchar_node adjacent to the left of the char_node. The signal ro is an output signal with 1 bit output to the mchar_node adjacent to the right of the char_node.

To the text character input section, text characters as a target of the pattern matching are supplied one-by-one every one clock cycle.

In the plurality of the char_nodes arranged horizontally in line, the char_node of the left end does not require naturally the li signal input section and the lo signal output section. Similarly, the char_node of the right end does not require naturally the ri signal input section and the ro signal output section. These input sections and output sections which are not required may be omitted.

Figure 3:
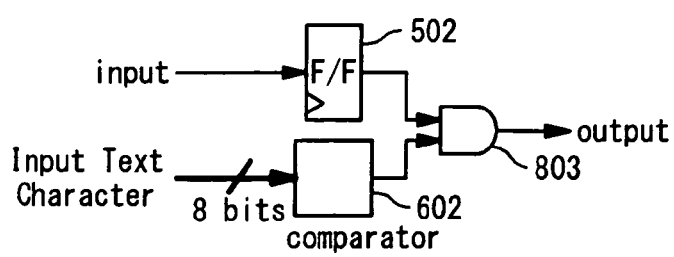
FIG. 3 is a circuit diagram of a basic block used for making the NFA be an actual circuit in a non-patent literature 2.
Figure 4:
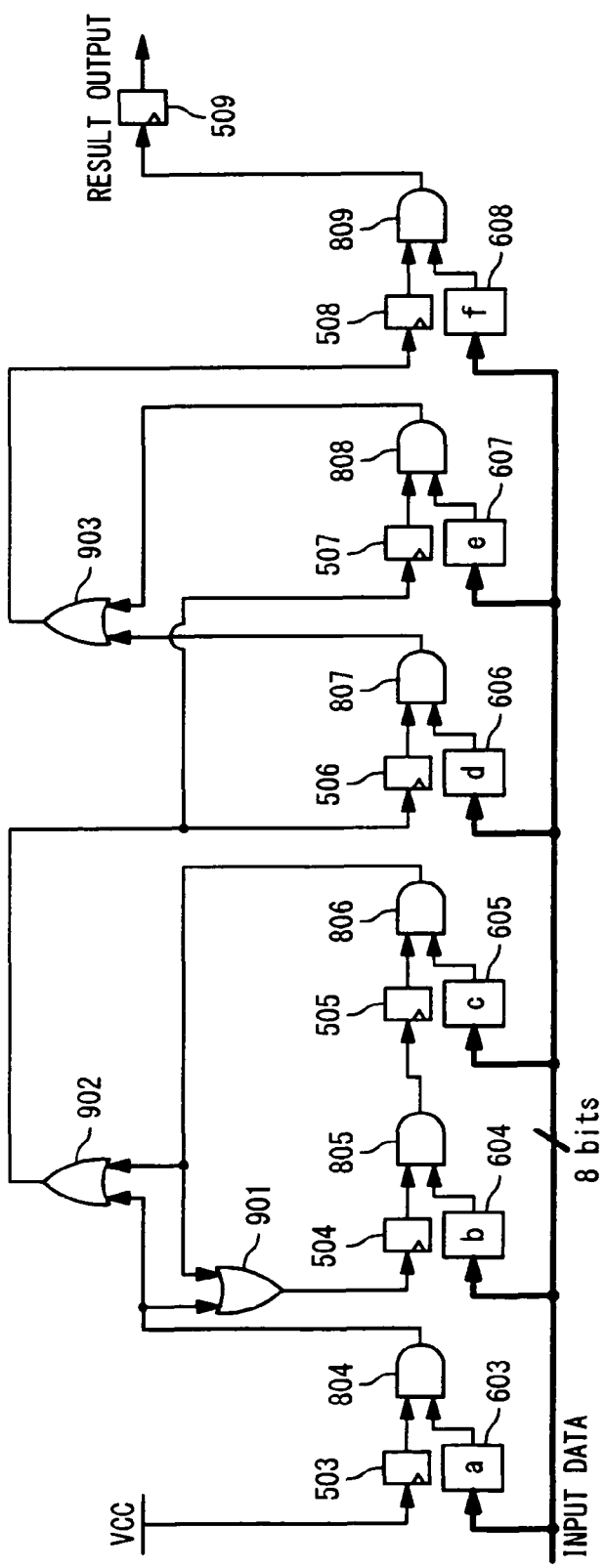
FIG. 4 is a circuit diagram of a pattern matching circuit corresponding to the "a(bc)*(d|e)f" using the regular expression according to the non-patent literature 2.

The internal configuration of the char_node 10 according to the present exemplary embodiment is the same as that of a basic block in a hardware circuit into which the NFA shown in FIG. 3 is directly embedded. That is, the char_node according to the present exemplary embodiment includes the Flip-Flop 502, the comparator 602 and the AND gate 803. Here, the output section of the Flip-Flop 502 and the output section of the comparator 602 are connected to both input sections of the AND gate 803, respectively.

Here, the char_node 10 according to the present exemplary embodiment receives two signals of the signal li and the signal ri. Therefore, in the previous stage of the signal input section (Input) of FIG. 3, one of the two input signals is required to be selected. The selection of the input signal depends on the finite automaton configured based on the configuration data.

As for the output signal of the char_node 10 according to the present exemplary embodiment, each of the signals lo and ro may be simultaneously output as the output signal (Output) of FIG. 3. Or, a selection circuit may be added at the later stage, the selection circuit being used for outputting as only the output signal to the mchar_node same as that from which the selected input signal is supplied.

Figure 8:
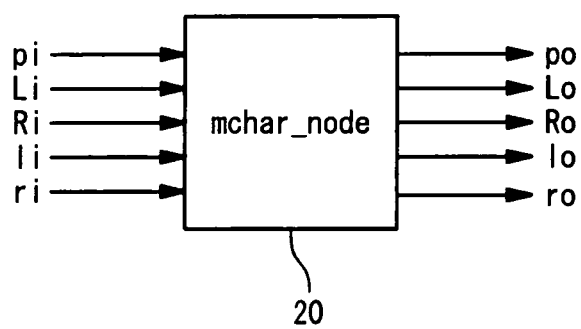
FIG. 8 is a block diagram describing input and output sections of a mchar_node according to the present invention.

FIG. 8 is a block diagram describing input and output sections of the mchar_node according to the present invention. The mchar_node 20 includes a pi signal input section, an Li signal input section, an Ri signal input section, an li signal input section, an ri signal input section, a po signal output section, an Lo output signal input section, an Ro signal output section, an lo signal output section and an ro signal output section.

Here, the signal pi is an input signal with 1 bit supplied from the MUX arranged above the mchar_node. The signal Li and the signal Ri are input signals with 1 bit respectively supplied from two mchar_nodes adjacent to the left and the right of the mchar_node. The signal li and the signal ri are input signals with 1 bit respectively supplied from two char_nodes adjacent to the left and the right of the mchar_node.

The signal po is an output signal with 1 bit output to the plurality of the snodes arranged above and corresponding to the mchar_node. The signal Lo and the signal Ro are output signals with 1 bit respectively output to two mchar_nodes adjacent to the left and the right of the mchar_node. The signal lo and the signal ro are output signals with 1 bit respectively output to two char_nodes adjacent to the left and the right of the mchar_node.

In the plurality of the mchar_nodes arranged horizontally in line, the mchar_node of the left end does not require naturally the Li signal input section and the Lo signal output section. Similarly, the mchar_node of the right end does not require naturally the Ri signal input section and the Ro signal output section. These input sections and output sections which are not required may be omitted.

Inside the mchar_node 20, the respective output signals are created by logical operations with the 5 input signals. This logical operations depends on the finite automaton configured based on the configuration data.

Figure 9:
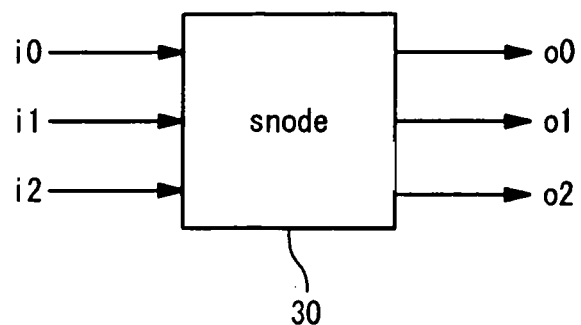
FIG. 9 is a block diagram describing input and output sections of a snode according to the first exemplary embodiment of the present invention.

FIG. 9 is a block diagram describing input and output sections of the snode according to the present exemplary embodiment. The snode 30 includes an i0 signal input section, an i1 signal input section, an i2 signal input section, an o0 signal output section, an o1 signal output section and an o2 signal output section.

Here, the signal i0 is an input signal with 1 bit supplied from the snode arranged above the snode. The signal i1 is an input signal with 1 bit supplied from the snode adjacent to the left of the snode or the mchar_node. The signal i2 is an input signal supplied from the snode adjacent to the right of the snode or the mchar_node.

The signal o0 is an output signal with 1 bit output to the snode arranged above the snode. The signal o1 is an output signal with 1 bit output to the snode or the MUX adjacent to the left of the snode. The signal o2 is an output signal with 1 bit output to the snode or the MUX adjacent to the right of the snode.

The snode 30 includes a switch connecting the 3 input signals to the respective output signals. Which of the respective output signals selectively outputs any of the input signals depends on the finite automaton configured, based on the configuration data.

Next, as a previous step of describing an operation of the generic logic 3, an arranging method in the case that respective nodes of an binary tree are arranged in line will be described. The non-patent literature 4 discloses that if this arranging method is used, "The layout of an arbitrary binary tree t of size (the number of nodes) n (n>0) can be performed in n×(layers(t)+1) cells" and "If t is a binary tree of size (the number of nodes) $2^n-1$ (n>1), then layers(t) is at most n−1". These lead to "The layout of an arbitrary binary tree t of size (the number of nodes) $2^n-1$ (n>1) can be performed in at most $(2^n-1)\times n$ cells." Hereinafter, the above arranging method disclosed in the non-patent literature 4 will be described.

Figure 10A:
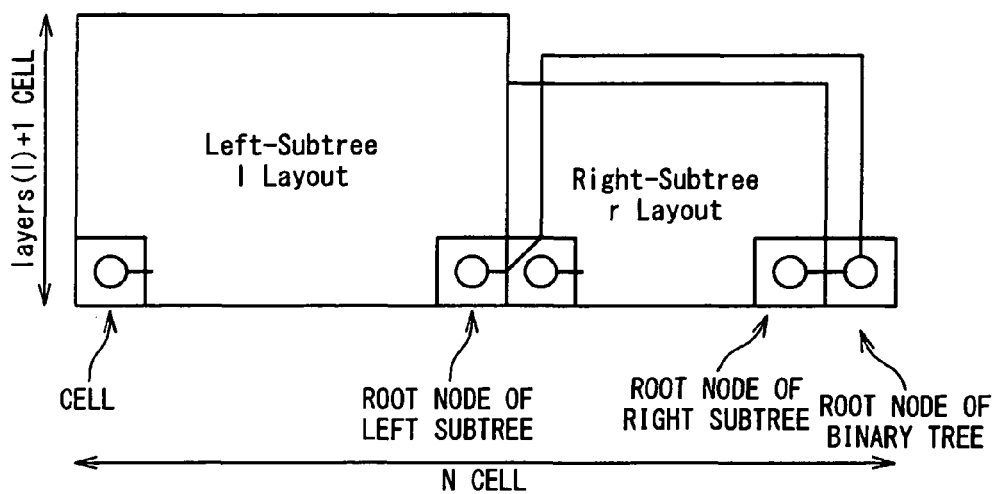
FIG. 10A is a schematic view of a case that a binary tree t with the number of nodes of n is arranged, in which layers(l) of a subtree l whose root is a left child node of a root node are different form layers(r) of a subtree r whose root is a right child node of the root node.
Figure 10B:
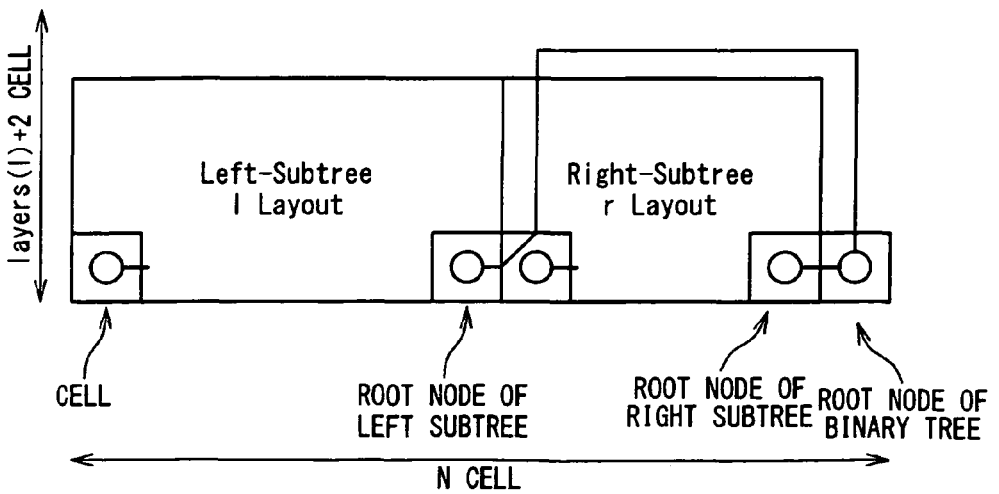
FIG. 10B is a schematic view of a case that a binary tree t with the number of nodes of n is arranged, in which layers(l) of a subtree l whose root is a left child node of a root node are the same as layers(r) of a subtree r whose root is a right child node of the root node.

FIGS. 10A and 10B are schematic views for describing cells and layers(t) in a conversion of binary tree. Based on these drawings, the description of the above-mentioned cells and layers(t) will be complemented. FIGS. 10A and 10B are views that supplementary explanations are added to the drawings disclosed in the non-patent literature 4.

A cell is defined as a block which can include a node itself and connection ports around the node in 4 directions of the left, right, top and bottom of the node. That is, a cell can exist, which does not include any node and is arranged for connecting nodes.

When a cell includes a node, the cell is arranged at the lowest layer. Therefore, in the cell including a node, the connection ports in only 3 directions of the left, right and top of the node in the 4 directions can be used.

When a cell including no node includes, for example, a wiring line connecting two ports of the top and bottom and a wiring line connecting two ports of the left and right, these two wiring lines cannot intersect with each other.

Usually, in a binary tree, an arbitrary node is connected to up to three node. Here, when a port in the top direction which is not used exists, this port in the top direction may be used as a port for connecting between the adjacent node and the cell in the top direction.

In the present arranging method, a root node of a binary tree t is arranged at the right end. In addition, a left-subtree l, of which a root is a left child node of the root node, and a right-subtree r, of which a root is a right child node of the root node, are arranged in this order from the left.

Similarly, in each subtree, a root node is arranged at the right end. A subtree, of which a root is a left child node of the root node, and a subtree, of which a root is a right child node of the root node, are arranged in this order from the left.

At this time, it is known that the layout of an arbitrary binary tree t of size (the number of nodes) n (n>0) can be performed in n×(layers(t)+1) cells.

In the non-patent literature 4, when the binary tree t is arranged to these cells arranged vertically and horizontally, the layers(t) is defined as the height of the cell including no node. In addition, the calculating method is defined as shown below.

1. The number of nodes in the binary tree t is 0:

layers(t)=−1.

2. The binary tree t consists of a subtree l, of which a root is a left child node of the root node, and a subtree r, of which a root is a right child node of the root node.

2.1 When the layers(l) and the layers(r) are different:

layers(t)=max{layers(l),layers(r)}

2.2 When the layers(l) and the layers(r) are the same:

layers(t)=layers(l)+1

For example, FIG. 10A is a schematic view of a case that the binary tree t with the number of nodes of n is arranged, in which the layers(l) of the subtree l whose root is a left child node of the root node are different from the layers(r) of the subtree r whose root is a right child node of the root node. FIG. 10B is a schematic view of a case that the binary tree t with the number of nodes of n is arranged, in which the layers(l) of the subtree l whose root is a left child node of the root node are the same as the layers (r) of the subtree r whose root is a right child node of the root node. In the case of FIG. 10A, the binary tree t is arranged using n×(layers(l)+1) cells, and the layers(t) are the same as the layers(l). Therefore, the binary tree t can be arranged using n×(layers(t)+1) cells. In the cased of FIG. 10B, the binary tree t is arranged using n×(layers(l)+2) cells, and the layers(t) are the same as the layers(l)+1. Therefore, the binary tree t can be arranged using n×(layers(t)+1) cells.

Incidentally, in the present arranging method, basically, by tracing the binary tree t based on the postorder traversal, the node arranging order is determined. Here, the left subtree is a subtree of which the value of the layers is larger than that of the other layers when the values of layers with respect to the subtree l and the subtree r, namely the layers(l) and the layers (r), are compared. That is, if the layers(r) is larger than the layers(l), the left-subtree l and the right-subtree r are interchanged.

Figure 11:
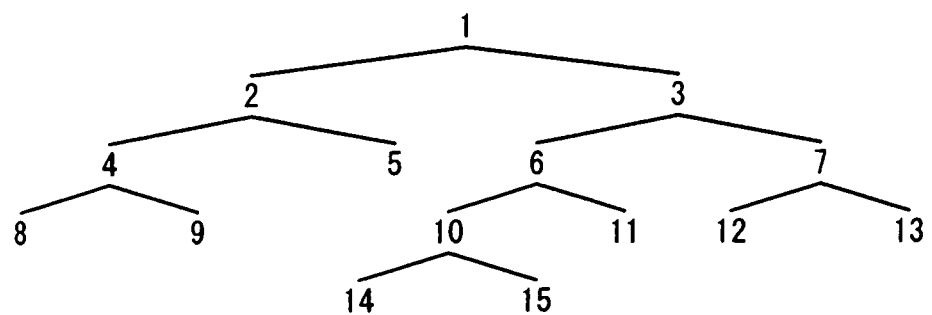
FIG. 11 is a graph describing an example of a binary tree with the number of nodes of 15.
Figure 12A:
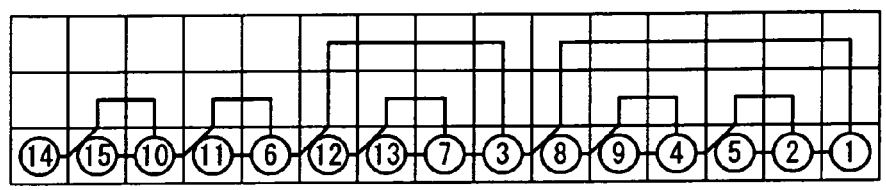
FIG. 12A is a view showing a result of arranging cells based on the binary tree of FIG. 11 according to an arranging method used in the present invention.

FIG. 11 is a graph describing an example of a binary tree with the number of nodes of 15. FIG. 12A is a view showing a result of arranging cells based on the binary tree of FIG. 11 according to the arranging method used in the present invention.

Here, because of $15=2^4-1$, the n=4 can be obtained. In this case, it is found that the binary tree can be arranged using up to 15×4 cells. Actually, as for the binary tree t shown in FIG. 11, because of the layers(t)=2, the binary tree can be arranged using up to 15×3 cells. Therefore, the binary tree satisfies the above-mentioned condition of the required number of cells. Even though the detailed description is omitted, if a case of an perfect binary tree with the number of nodes of 15 is considered, because of the layers(t)=3, this perfect binary tree also satisfies the above-mentioned condition.

According to FIGS. 10A, 10B, 11 and 12A, it is found that when respective nodes of the binary tree are arranged in line, the layers is a channel in the horizontal direction, which is necessary for correctly performing the connections. Hereinafter it referred to a "routing layer".

On the basis of the above facts, a method of configuring a generic logic as a finite automaton circuit which indicates the regular expression including metacharacters of which the number of characters is M and text characters of which the number of characters is N.

The regular expression which can be handled in the present invention is the require expression that can be expressed by a syntax tree using a symbol "·" indicting Concatenation in addition to "|" indicating OR and "*" indicating matching up 0 times or more. Hereinafter, the symbol "·" indicting Concatenation is handled as the metacharacter.

For example, if N1 and N2 are regular expressions, "N1|N2" of the regular expression indicates that "N1|N2" coincides with N1 or N2. Similarly, "N1*" of the regular expression indicates that N1 is matched up 0 times or more. Further, "N1·N2" of the regular expression indicates that N2 is next to N1 continuously.

The regular expression including metacharacters other than above these metacharacters is handled by rewriting the regular expression using only above these metacharacters.

As shown in FIG. 6, in the generic logic of the present exemplary embodiment, the char_nodes corresponding to the text characters are arranged below the mchar_nodes corresponding to the metacharacters. In addition, the number of the char_nodes is larger than the number of the mchar_nodes by one. Let us suppose that N is the number of the mchar_nodes and M is the number of the char_nodes. In this case, the relation of M=N+1 can be obtained. This generic logic can correspond to the regular expression including N characters of the metacharacters and N+1 characters of the text characters.

Here, according to the non-patent literature 4, the number of routing layers necessary for the binary tree of which the number of the nodes is N becomes $\log_2(N+1)-1$ at a maximum. If the number of the nodes is $2^n-1=N$, since n becomes $\log_2(N+1)$, it is apparent that the number of the layers becomes $n-1=\log_2(N+1)-1$ at a maximum.

Figure 12B:
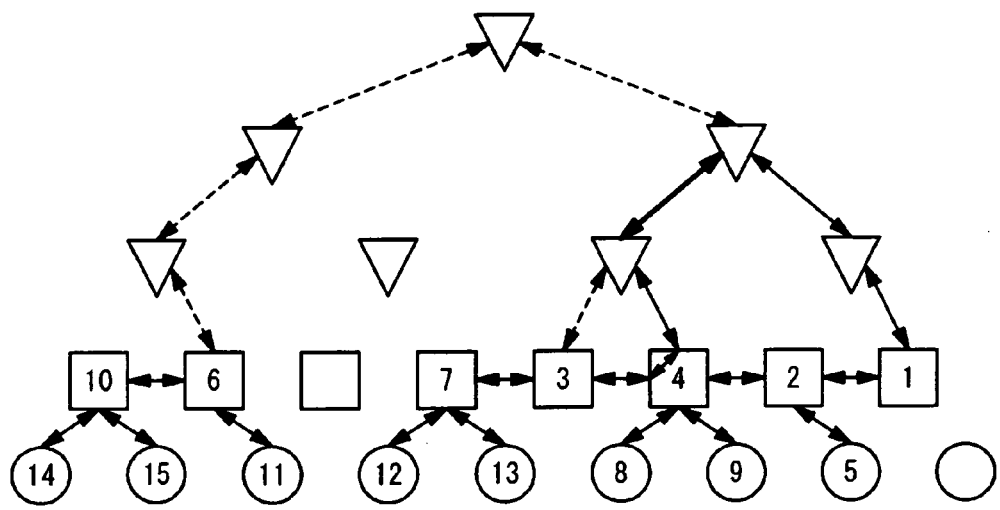
FIG. 12B is a schematic view showing a case applying the arrangement shown in FIG. 12A to the generic logic.

As described above, the routing layer is, when respective nodes of the binary tree are arranged in line, a channel in a horizontal direction, which is necessary for correctly performing the connections. The routing layer relates to the necessary number of the binary trees in which the mchar_node is a leaf node and the snode is a node in the generic logic. In this binary tree, when certain mchar_nodes are connected, a bi-directional signal line between the mchar_nodes is provided. However, there is a case that the connections between the mchar_nodes relating to the same layer number should be required to use the same signal line between the snodes. For example, FIG. 12B is a schematic view showing a case applying the arranging method shown in FIG. 12A to the generic logic. Here, since a leaf node indicates a text character in the syntax tree of the regular expression, the arrangement is slightly different from that of FIG. 12A. In FIG. 12B, nodes represented by circles are char_nodes, nodes represented by squares are mchar_nodes and nodes represented by triangles are snodes. In FIG. 12B, the connection between the node 1 and the node 3 of the mchar_nodes indicated by the solid lines (via the node 4 in FIG. 12B) and the connection between the node 3 and the node 6 indicated by the dashed lines use the same connection between the snodes indicated by the thick line in FIG. 12B. Therefore, the necessary number of the binary trees in which the mchar_node is a leaf node and the snode is a node in the generic logic is the double of the number of the routing layers. Specifically, when the number of the mchar_nodes included in the generic logic is small, the necessary number may be the same as the number of the routing layers. Generally, the necessary number is the double of the number of the routing layers.

These are summarized as follows. In the present invention, in the case of configuring the regular expression including the metacharacters of which the number of characters is N and the text characters of which the number of characters is N+1, the generic logic can be configured by using the following method:

(1) arranging N mchar_nodes and (N+1) char_nodes;

(2) providing B binary trees each of which includes N mchar_nodes as leaf nodes and (N+1) snodes as non-leaf nodes, wherein the necessary number B of the binary trees is $B=\lceil \log_2(N+1)-1 \rceil \times 2$ and $\lceil x \rceil$ is a minimum integer not less than x; and (3) providing MUXs each of which has B inputs.

Incidentally, in the generic logic shown in FIGS. 5 and 6, only two of the binary trees each of which includes the mchar_nodes as leaf nodes and the snodes as non-leaf nodes are shown. However, actually, further two similar binary trees are necessary, and a total of four binary trees are necessary. This is apparently understood that, as described in the above (2), the necessary number B is the double of 2 which is a minimum integer not less than $\log_2 5-1$, that is 4. Here, as described above, if the number of the mchar_nodes is small, especially as shown in FIGS. 5 and 6, there is no case that a connection between certain mchar_nodes is performed by using the same connection signal between snodes in an identical binary tree. Therefore, practically, there is no problem if the number of the binary trees is 2. Generally, it is enough to provide the above B binary trees.

Finally, a method of configuring the actual regular expression in this generic logic circuit will be described. Generally, there is a possibility that the regular expression including text characters of which the number of characters is N+1 includes metacharacters "|", "*", "·" of which the number of characters is N+1 at a maximum. This is because the metacharacter "*" has only one child node. There is a case that a syntax tree of the regular expression including the metacharacter "*" is not a full binary tree. On the other hand, the generic logic circuit can configure only the regular expression composed of the metacharacters of which the number of characters is N and the text characters of which the number of characters is N+1. Therefore, the present invention solves the above problem by merging the metacharacter "*" with another metacharacter or adding an empty text character as a child node to the metacharacter "*" to create the syntax tree.

Figure 13A:
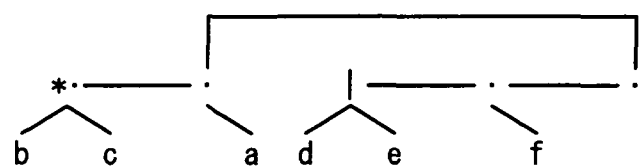
FIG. 13A is a graph describing an example of a syntax tree obtained by applying a node arranging method according to the present invention to the regular expression of "a(bc)*(d|e)f"
Figure 13B:
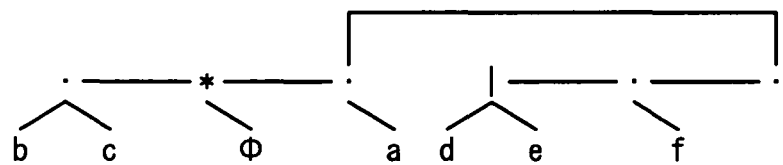
FIG. 13B is a graph describing an example of a syntax tree obtained by applying anode arranging method according to the present invention to the regular expression of "a(bc)*(d|e)f"

FIGS. 13A and 13B are graphs describing an example of a syntax tree obtained by applying the node arranging method according to the present invention to the regular expression of "a(bc)*(d|e)f". In FIG. 13A, by merging the metacharacter "*" with the metacharacter "·" which is a child node of the metacharacter "*", the metacharacter node "*·" is created. Here, the original meaning of the regular expression does not change even in this merging of the metacharacters. In FIG. 13B, the "·" which is a child node of the "*" and the "φ" which indicates an empty character are created as the left child node and the right child node, respectively. The above FIGS. 13A and 13B indicate that, when the child node of the metacharacter "*" is the metacharacter "·", the method of merging them and the method of adding the text character of the empty "φ". Generally, the mchar_nodes and the char_nodes in the generic logic can be effectively used in the case that, when the child node of the metacharacter "*" is the metacharacter, then the method of merging them is used, and only when the child node of the metacharacter "*" is the text character, then the method of adding the text character of the empty is used.

After these arrangements of the nodes of the binary trees, the metacharacters and the text characters are assigned to the respective nodes of the generic logic. Further, configuration data for performing necessary connections is created. Finally, by the configuration controller, the created configuration data is configured. Consequently, even though the length and the available metacharacters are limited, a syntax tree corresponding to an arbitrary regular expression can be realized as the generic logic according to the present invention.

Figure 14:
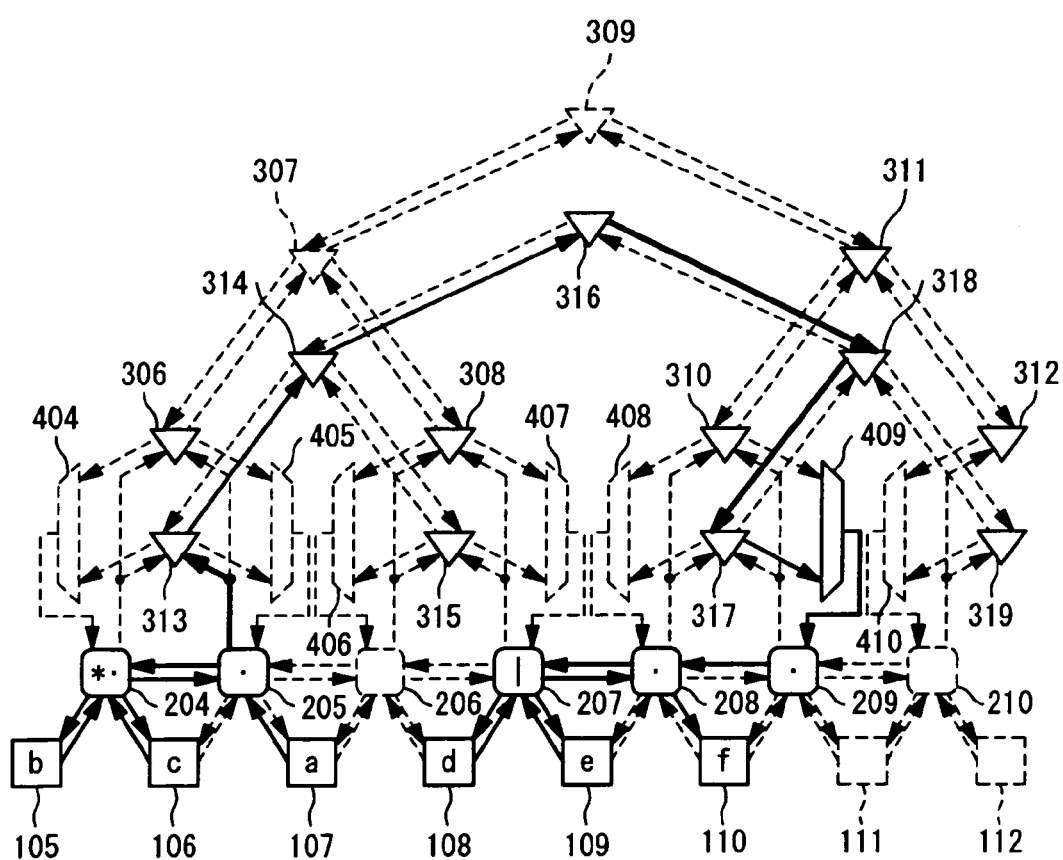
FIG. 14 is a block diagram describing an example of realizing the syntax tree of FIG. 13A by using the generic logic according to the first exemplary embodiment of the preset invention.

FIG. 14 is a block diagram describing an example of configuring the syntax tree of FIG. 13A by using the generic logic according to the present exemplary embodiment. Here, the generic logic of FIG. 14 is the configuration example which includes 7 mchar_nodes and 8 char_nodes. Therefore, in this example, the number of the char_nodes, the number of the mchar_nodes, the number of the MUXs, the number of the snodes and the number of the snode stages also increase as compared with the generic logic of FIG. 6. Even though only two binary trees each of which includes the mchar_nodes as leaf nodes and the snodes as non-leaf nodes are shown, actually, further two similar binary trees are necessary, and a total of four binary trees are necessary. This is apparently understood that the double of 2 which is a minimum integer not less than the necessary number $\log_2 8-1$ is 4.

Incidentally, in this generic logic, input signals of the text characters as the target of the pattern matching are omitted. In addition, wiring lines and the like unnecessary for configuring this regular expression are indicated using dashed lines.

A method of performing a pattern matching after the appropriate metacharacters and text characters are assigned to the respective nodes and the connections of the snodes are carried out as shown in FIG. 14 will be described next.

The pattern matching is started from a char_nodes 107 to which the head character "a" of the regular expression is assigned.

Incidentally, even though the basic operation of the inside of each char_node is the same as that in the non-patent literature 2 or the non-patent literature 3, it will be simply described again based on FIG. 3 just in case. That is, the Flip-Flop 502 configures each state of the NFA. The comparator 602 compares the character of the transition condition from the state with the input text character. The AND gate 803 creates the state transition signal based on the output of the Flip-Flop 502 and the output of the comparator 602. In addition, other than FIG. 3, as an operation when the empty character "φ" is assigned, the input state transition signal may be output as it is without performing any processing inside.

In each mchar_node, based on the connections, the configuration data for performing the logic operation to create the output signal from the input signal is set.

For example, an operation of a mchar_node 205 will be described with reference to FIGS. 8 and 14.

The mchar_node 205 receives a signal output from the char_node 107 adjacent to the right of the mchar_node 205 as a signal ri. Further, the mchar_node 205 outputs the signal ri to the mchar_node 204 adjacent to the left of the mchar_node 205 as a signal Lo. Here, inside of the mchar_node 205, an input section of the signal ri and an output section of the signal Lo are connected.

Simultaneously, the mchar_node 205 receives a signal output from the mchar_node 204 adjacent to the left of the mchar_node 205 as a signal Li. Further, the mchar_node 205 outputs the input signal Li to the snode 313 as an output signal po. Here, inside of the mchar_node 205, an input section of the signal Li and an output section of the signal po are connected.

Here, logics of respective output signals of the mchar_node 205 are set as follows.

<Output Signals of mchar_node205>
  po=Li
  Lo=ri
  Ro=Low
  lo=Low
  ro=Low Similarly, the mchar_node 204 receives a signal from the mchar_node 205 adjacent to the right of the mchar_node 204 as a signal Ri. Then, the configuration data to create an output signal for matching up the string "bc" 0 times or more is set. Here, the string "bc" can be obtained by combining the text characters "b" and "c" respectively stored in the two char_node 105 and 106 connected to the mchar_node 204 and the metacharacter "·" stored in the mchar_node 204. In addition, "matching up 0 times or more" is a meaning of the metacharacter "*" stored in the mchar_node 204.

In this case, logics of respective output signals are set as follows.

<Output Signals of mchar_node204>
  po=Low
  Ro=Ri+ri
  lo=Ri+ri
  ro=li Incidentally, the mchar_node 204 is positioned at the left end of the mchar_nodes 204 to 210 arranged horizontally inline. Therefore, in the mchar_node 204, the input signal Li and the output signal Lo do not exist.

Even though the detailed description of other mchar_nodes is omitted, similarly to the above example, the configuration data to create output signals of the respective mchar_nodes are set. In addition, as for the snodes 313, 314, 316, 317 and 318 and the MUX 409, even though the connections shown as the solid lines in FIG. 14 can be set, since the logics of the output signals are obvious, the detailed description is omitted.

The matching is started from the char_node 107 to which the head character "a" of the regular expression is assigned. When the Flip-Flop provided inside the char_node 110 to which the end character "f" of the regular expression is assigned becomes high, it can be judged that the pattern for this regular expression has been found. Incidentally, the control signal indicating this matching result is separately provided.

According to the method mentioned above, a desired arbitrary regular expression can be configured in the generic logic.

First Example

Next, the first example of the present invention will be described with reference to the drawings. This example corresponds to the first exemplary embodiment for carrying out the present invention.

In the present exemplary embodiment, the hardware circuits of the configuration controller 1 and the generic logic 3 are configured on the FPGA.

The storage device 2 may be an on-chip RAM on the FPGA, or may be a memory element such as an external memory arranged in a chip other than the FPGA.

The configuration controller 1 is realized as the hardware circuit performing the above operations (1) to (6) based on commands supplied from outside.

The generic logic 3 is configured as the circuit including various nodes each of which the number of the nodes is appropriate according to the desired number of the metacharacters N. Here, the number of the text characters is determined based on the number of the metacharacters N.

In the case that the pattern matching apparatus of the present example is configured on the FPGA, each combinational circuit is configured using a logic operation table so-called LUT (Look-Up Table). The number of input signals of the LUT is different depending on the FPGA device. For example, 6 inputs is provided in the Virtex-5 FPGA produced by the Xilinx Incorporated. The architecture of the respective nodes of this case will be described below.

Figure 15:
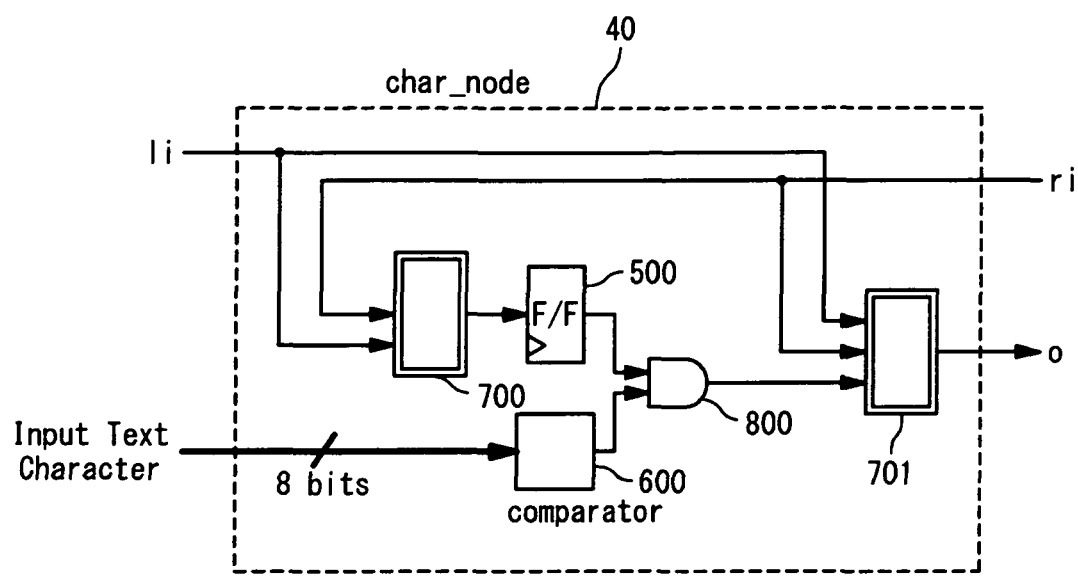
FIG. 15 is a circuit diagram describing a detailed architecture of the char_node in the first example of the present invention.

FIG. 15 is a circuit diagram describing a detailed architecture of the char_node in the present example. This char_node 40 includes a LUT 700, a Flip-Flop (F/F) 500, a comparator 600, an AND gate 800, a LUT 701, a li signal input section, a ri signal input section, an input section for inputting input text characters of a target of the pattern matching, and an o signal output section.

Incidentally, even though the comparator 600 is configured using the LUT, for ease in description, it is shown here as just the comparator 600. Since a method of configuring the comparator 600 using the LUT is disclosed in the non-patent literature 2, the detailed description is omitted here.

In addition, even though the AND gate 800 is also configured using the LUT in the FPGA, it is shown here as just the AND gate because it is a static logic element. This AND gate may be configured using a single LUT, or may be configured merging the LUT 701.

The connection relations among respective configuration elements inside the char_node 40 will be described. The li signal input section is connected to a first input section of the LUT 700 and a first input section of the LUT 701. The ri signal input section is connected to a second input section of the LUT 700 and a second input section of the LUT 701. The output section of the LUT 700 is connected to an input section of the Flip-Flop 500. The output section of the Flip-Flop 500 is connected to a first input section of the AND gate 800. The text character input section is connected to an input section of the comparator 600. An output section of the comparator 600 is connected to a second input section of the AND gate 800. An output section of the AND gate 800 is connected to a third input section of the LUT 701. An output section of the LUT 701 is connected to the o signal output section.

The signal o is output to the mchar_nodes adjacent to the left and right of the char_node 40 as output signals lo and ro.

When receiving two signals li and ri, the char_node configured as shown in FIG. 15 selects one of them based on the setting of the LUT 700. The selected input signal becomes the output signal of the LUT 700, and is stored in the Flip-Flop 500. The Flip-Flop 500 outputs the stored content to the AND gate 800 as the output signal.

In the comparator 600, the character which is a target of comparison is set by using the configuration data. The comparator 600 compares the set character with the input text character which is a target of pattern matching. The comparator 600 outputs the result of the comparison to the AND gate 800 as the output signal.

The AND gate 800 receives the signal output from the Flip-Flop 500 and the signal output from the comparator 600 and then performs the AND operation to output the result of the operation.

The LUT 701 receives the signal output from the AND gate 800, the input signal li and the input signal ri. The LUT 701 selects any of the three signals based on the setting of the LUT 701 and outputs the selected signal.

Incidentally, in FIG. 15, as both of the output signals lo and ro of the char_node 40, the output signal o is output as it is. However, the LUTs, which select the respective output signals, may be provided inside the char_node 40, and may individually output the respective output signals based on the settings of the LUTs. In this case, the LUT, which has the same connection relation as that of the LUT 701, is required separately.

Figure 16:
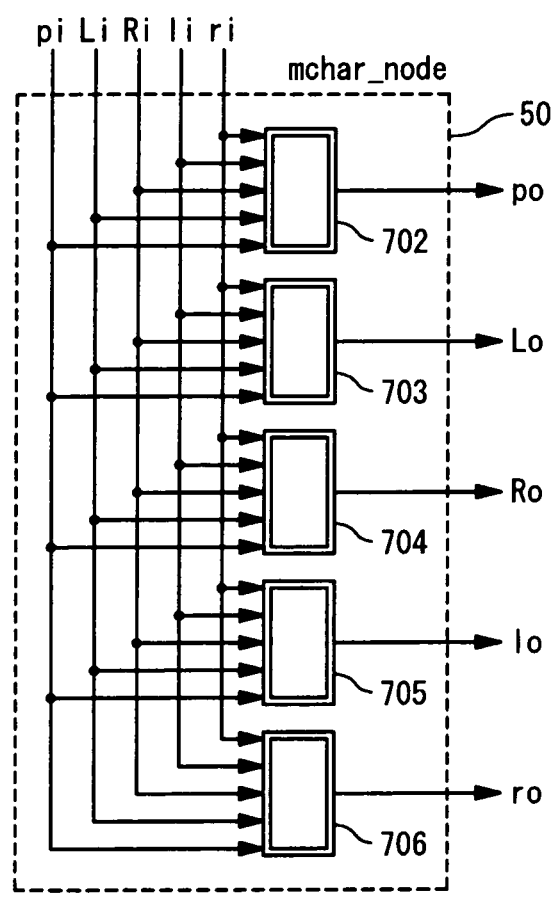
FIG. 16 is a block diagram describing an internal structure of the mchar_node according to the present invention.

FIG. 16 is a block diagram describing an internal structure of the mchar_node 50 according to the present invention. The mchar_node 50 includes five input sections, five LUTs 702 to 706 each of which has five input sections and one output section and five output sections.

The five input sections of the LUT 702 are connected to the pi signal input section, the Li signal input section, the Ri signal input section, the li signal input section and the ri signal input section, respectively. The other LUTs 703 to 706 are the same configurations as the configuration of the LUT 702, of which the five signal input sections of the mchar_node 50 are respectively connected to the five signal input sections of the LUT. In addition, the output sections of the LUTs 702 to 706 are connected to the po signal output section, the Lo signal output section, the Ro signal output section, the lo signal output section and the ro signal output section, respectively.

In this mchar_node 50, which of the input signals is output as which of the output signals can be arbitrarily set based on the logic operation depending on the settings of the LUTs 702 to 706.

Figure 17:
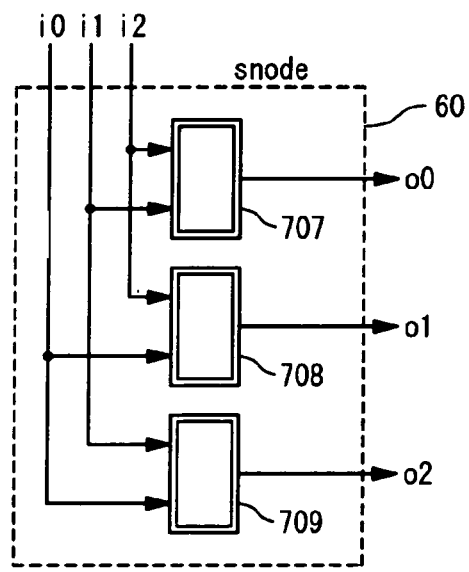
FIG. 17 is a circuit diagram describing a detailed architecture of the snode according to the first exemplary embodiment of the present invention.

FIG. 17 is a circuit diagram describing a detailed architecture of the snode according to the first exemplary embodiment of the present invention. The snode 60 includes three LUTs 707 to 709, an i0 signal input section, an i1 signal input section, an i2 signal input section, an o0 signal output section, an o1 signal output section and an o2 signal output section.

The LUT 707 includes an input section connected to the i1 signal input section, an input section connected to the i2 signal input section and an output section connected to the o0 signal output section. Based on the setting of the LUT 707, the LUT 707 outputs one of the input signals i1 and i2 as the signal o0.

Similarly, the LUT 708 includes an input section connected to the i0 signal input section, an input section connected to the i2 signal input section and an output section connected to the o1 signal output section. Based on the setting of the LUT 708, the LUT 708 outputs one of the input signals i0 and i2 as the signal o1.

Further, the LUT 709 includes an input section connected to the i0 signal input section, an input section connected to the i1 signal input section and an output section connected to the o2 signal output section. Based on the setting of the LUT 709, the LUT 709 outputs one of the input signals i0 and i1 as the signal o2.

Each MUX in the generic logic 3 according to the present example is a circuit for selecting a signal supplied to each mchar_node from a plurality of candidates. The number of candidates is the same as the number of binary trees, which are included in the generic logic 3, configured using the snodes. Since the configuration of each MUX is self-evident for one skilled in the art, the detailed description is omitted.

By rewriting the internal data of the respective LUT of the generic logic 3 configured using the node circuits mentioned above by the configuration data configured by the configuration controller 1, the regular expression configured on the generic logic 3 can be dynamically reconfigured. Here, as the specific method of changing the content of the LUT provided in the FPGA mentioned above the well-known method, which is used in the non-patent literature 3, can be used, for example, which uses LUTs capable of being applied as a shift register in the FPGA of the Xilinx Incorporated.

Incidentally, the configuration of each node shown in the first example is just one example and the present invention is not limited to this. That is, it is not necessary to configure the node using the LUT of which the number of the LUTs is the same as that described in this example. The similar function may be configured using a plurality of LUTs. The LUT may be configured using memory elements such as registers.

Second Example

Next, the second example of the present invention will be described with reference to the drawings. This example corresponds to the first exemplary embodiment for carrying out the present invention.

As compared with the first example, the present example is different in the configuration of the char_node of the generic logic 3. The other configurations are the same as those of the first example.

Figure 18:
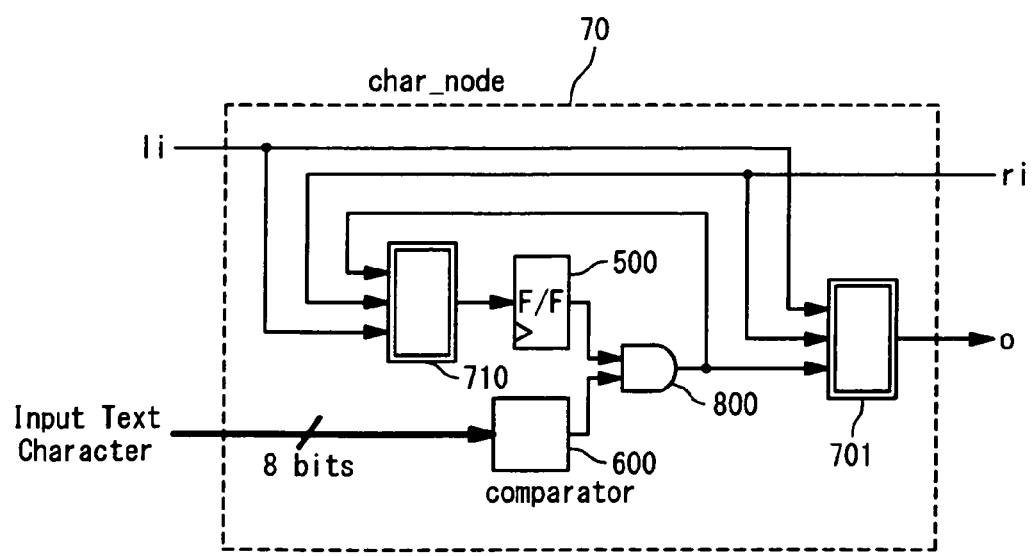
FIG. 18 is a circuit diagram describing a detailed architecture of the char_node according to the second example of the present invention.

FIG. 18 is a circuit diagram describing a detailed architecture of the char_node according to the present example. In this char_node 70, the LUT 710 is provided instead of the LUT 700 in the char_node 40 of the first example. In addition to the two signals li and ri supplied to the LUT 700, the LUT 710 receives the output signal from the AND gate 800. Therefore, the signal output to the Flip-Flop 500 by the LUT 710 is created by performing the logic operation based on the input signal li, the input signal ri and the output signal of the AND gate 800. Since the other configurations of the char_node 70 are the same as those of the char_node 40 according to the first example, the detailed description is omitted.

In the first example, the metacharacter "*", which is included in the regular expression configured on the generic logic 3, constitutes the syntax tree and is assigned to the mchar_node by merging with another metacharacter or adding the text character of the empty to the child node. However, in the second example, by using the char_node configured as shown in FIG. 18, only when the metacharacter "*" means that the text character of which the number of characters is one is repeated 0 times or more, that is, only when the child node of the metacharacter "*" is the text character, the metacharacter "*" can be merged with the text character to be assigned to the char_node.

For example, the different between the first example and the second example will be described in the case that the regular expression of the "ab*(c|d)e" is dealt with.

Figure 19:
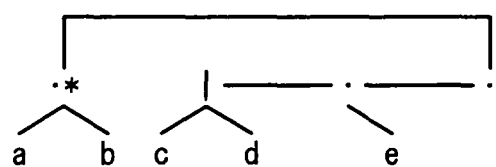
FIG. 19 is a graph describing an example of a syntax tree obtained by applying anode arranging method according to the first example of the present invention to the regular expression of "ab*(c|d)e"

FIG. 19 is a graph describing an example of a syntax tree obtained by applying the node arranging method according to the first example to the regular expression of "ab*(c|d)e". In the first example, it is necessary to create the configuration data by merging the metacharacter "*" and the metacharacter "·" of its parent node to create the metacharacter node "·*", assigning it to the mchar_node and taking into account its meaning.

Figure 20:
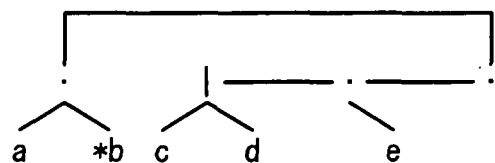
FIG. 20 is a graph describing an example of a syntax tree obtained by applying anode arranging method according to the second example of the present invention to the regular expression of "ab*(c|d)e"

FIG. 20 is a graph describing an example of a syntax tree obtained by applying anode arranging method according to the present example to the regular expression of "ab*(c|d)e". In the second example, the metacharacter "*" can be merged with the character "b" and be assigned to a char_node. According to this, when the char_node is connected to a mchar_node adjacent to the left of the char_node, if one of the input signal li and the output signal of the AND gate 800 is in the High state, the LUT 710 of the char_node 70 outputs a signal of the High state. When the char_node is connected to a mchar_node adjacent to the right of the char_node, if one of the input signal ri and the output signal of the AND gate 800 is in the High state, the LUT 710 of the char_node 70 outputs a signal of the High state. In this case, it is not necessary to perform the logic operation of each output signal of the mchar_node taking into account the meaning of the metacharacter "*".

As shown above, in the present second example, only when the metacharacter "*" means the matching up 0 times or more with respect to the text character of which the number of characters is one, the metacharacter "*" can be merged with the text character and be assigned to the char_node. As a result, it can be easy to create the configuration data which crates the logic operation of each output signal of the mchar_node.

Incidentally, in the present second example, similarly to the first example, the metacharacter "*" can be merged with another metacharacter and be assigned to a mchar_node. In addition, similarly to the first example, the configuration of each node shown in the second example is just one example and the present invention is not limited to this. That is, it is not necessary to configure the node using the LUT of which the number of the LUTs is the same as that described in this example. The similar function may be configured using a plurality of LUTs.

Third Example

Next, the third example of the present invention will be described with reference to the drawings. This example corresponds to the first exemplary embodiment for carrying out the present invention.

The hardware circuits of the configuration controller 1 and the generic logic 3 of the present example are implemented on a chip as exclusive hardware such as ASICs.

In addition, the storage device 2 of the present example includes a memory element such as an external memory arranged on a chip other than the above chip.

The configuration controller 1 according to the present example has the same function as that of the first example or the second example. That is, in the configuration controller 1, a logic operation based on a logic truth table by a LUT is realized as a hardware circuit in which operation processing is performed by logic elements such as an AND gate and an OR gate.

The generic logic 3 according to the present example has the same configuration and operational function as those of the first example or the second example, similar to the configuration controller 1. That is, in the generic logic 3, a logic operation based on a logic truth table by a LUT is realized as a hardware circuit in which operation processing is performed by using logic elements such as an AND gate and an OR gate. However, the logic operation of each configuration node in this generic logic can rewrite signal selections and logics by using registers, register arrays and the like. That is, these setting registers are architectures which can be rewritten by using the configuration data set by the configuration controller 1.

Figure 21:
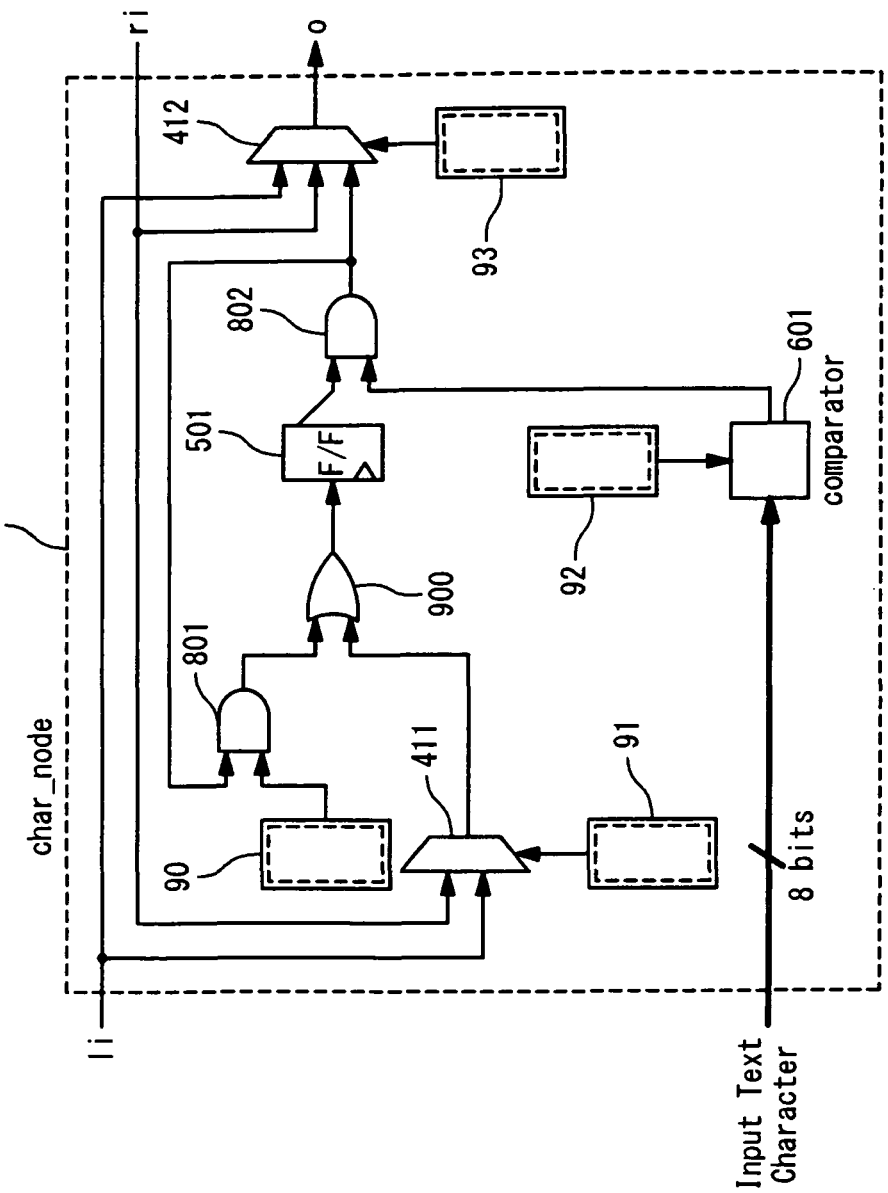
FIG. 21 is a circuit diagram describing a detailed architecture of the char_node according to the third example of the present invention.

FIG. 21 is a circuit diagram describing a detailed architecture of the char_node according to the present example. This char_node 80 includes a li signal input section, a ri signal input section, a setting register 91, a MUX 411, a setting register 90, an AND gate 801, an OR gate 900, a Flip-Flop (F/F) 501, an input section for inputting an input text character of a target for the pattern matching, a setting register 92, a comparator 601, an OR gate 802, a setting register 93, a MUX 412 and an o signal output section.

The connection relations among the respective configuration elements in this char_node 80 will be described. The li signal input section is connected to a first input section of the MUX 411 and a first input section of the MUX 412. The ri signal input section is connected to a second input section of the MUX 411 and a second input section of the MUX 412. An output section of the setting register 91 is connected to a third input section of the MUX 411. An output section of the setting register 90 is connected to a first input section of the AND gate 801. An output section of the MUX 411 is connected to a first input section of the OR gate 900. An output section of the AND gate 801 is connected to a second input section of the OR gate 900. An output section of the OR gate 900 is connected to an input section of the Flip-Flop 501. An input section of the input text character is connected to a first input section of the comparator 601. An output section of the setting register 92 is connected to a second input section of the comparator 601. An output section of the Flip-Flop 501 is connected to a first input section of the AND gate 802. An output section of the comparator 601 is connected to a second input section of the AND gate 802. An output section of the AND gate 802 is connected to a second input section of the AND gate 801 and a third input section of the MUX 412. An output section of the setting register 93 is connected to a fourth input section of the MUX 412. An output section of the MUX 412 is connected to the o signal output section.

The signal input and output sections of the char_node 80 of the present example are the same as those of the first example shown in FIG. 15 or the second example shown in FIG. 18.

The operation of the char_node according to the present example will be described below. Values stored in the respective setting registers can be rewritten by using the configuration data set by the configuration controller 1. By rewriting the values in the setting registers, the logic operation performed by the char_node can be arbitrarily configured.

The MUX 411 selectively outputs one of the input signals li and ri based on the value set by the setting register 91.

In the present example, similar to the second example, the metacharacter "*" can be merged with the text character of which the number of characters is one and be assigned to the char_node. The value corresponding to whether or not the merging is carried out is set in the setting register 90. For example, when the merging is carried out, "1" is set in the setting register 90. When the merging is not carried out, "0" is set in the setting register 90.

The AND gate 801 performs the AND operation between the result of the AND gate 802 and the value set in the setting register 90 and outputs the result. The OR gate 900 performs the OR operation between the output of the AND operation and the input signal selected by the MUX 411 and outputs the result. The Flip-Flop 501 receives the output of the OR operation.

Similarly, the setting register 93 sets a value for selecting one of the input signal li, the input signal ri and the operation result of the AND gate 802 as the output of MUX 412.

The setting register 92 includes a register group for multiple bits. In the setting register 92, the character to which the matching is carried out in the char_node is set. The comparator 601 compares the value set in the setting register 92 and the input text character and outputs the result.

Here, in the example of the FIG. 21, the output signal o itself is used as the output signals lo and ro of the char_node 80. However, logic elements and setting registers for selecting different output signals as the output signals lo and ro may be provided in the char_node 80.

In addition, the char_node 80 according to the present example has a configuration which realizes the char_node 70 of the second example as a hardware circuit by using the logic elements. However, the char_node 80 may have a configuration which realizes the char_node 40 of the first example as a hardware circuit. In this case, the metacharacter "*" is assigned to the mchar_node by certainly merging the metacharacter "*" with another metacharacter or adding a character indicating an empty to the metacharacter "*" as the child node.

In addition, the other node configurations in the generic logic of the present example may be similarly configured. That is, it is enough that the node has the configuration that if the same function as that of the first example or the second example can be changed by providing the setting register group inside the node and rewriting its content based on the configuration data set by the configuration controller 1.

In the generic logic of the fist example and the second example, the logic operation using the truth table of the LUT in the FPGA is performed. However, in the generic logic of the third example, as described above, without using the LUT, hardware is directly provided by using the setting register group and the logic elements. According to this, a desired finite automaton can be configured by rewriting the setting register group based on the configuration data set by the configuration controller 1.

Next, the action and effect of the first exemplary embodiment of the present invention will be described.

In the present exemplary embodiment, the regular expression which can be expressed as a syntax tree by only using the metacharacters "|" and "*", the symbol "·" indicting concatenation and text characters can be dynamically configured on the generic logic.

As described above, using the conventional method, the regular expression can be dynamically reconfigured. However, the regular expression which includes the regular expression containing the metacharacter in a nest cannot be configured. That is, the conventional method has the problem that there are limiting conditions for configuring the regular expression. For example, the conventional method cannot configure the regular expression such as "a(b+cd)*e".

On the other hand, in the present exemplary embodiment, by rewriting the above-mentioned regular expression to the regular expression "a(bb*cd)*e" only using the metacharacters "|" and "*", and then expressing it by using the syntax tree, the above-mentioned regular expression can be configured on the generic logic according to the present exemplary embodiment. In addition, generally, the regular expression using the metacharacters other than the metacharacters "|" and "*" can also be rewritten to the regular expression only using these two metacharacters. Therefore, the present exemplary embodiment can deal with a regular expression having more flexible expression.

The conventional method can dynamically reconfigure the NFA by providing with the wiring lines from each register indicating the state to all registers and reconfiguring the connection configuration between the states and the state transition condition using the set values in the register array. That is, the conventional method can configure all of the NFA having whatever transition. On the other hand, the amount of hardware is increased at a rate of $O(N^2)$ with respect to the number of states: N. Thus, there is a problem in the scalability with respect to the number of states.

On the other hand, let us suppose the generic logic having N states. In this case, since N char_nodes exist, the number of mchar_nodes is N−1, the number of MUXs is N−1. Then, the necessary number of binary trees undertaking a role of a channel which is configured using mchar_nodes as leaves and snodes is $\log_2 N−1$ at a maximum. In this case, the increase amount of the snodes included in one binary tree is the O(N). Therefore, as a whole, with respect to the number of states: N, the amount of hardware is increased at a rate of $O(N \log_2 N)$.

That is, the present exemplary embodiment can suppress the increase of the amount of the hardware as compared with the conventional method.

(Second Exemplary Embodiment)

Next, the second exemplary embodiment according to the present invention will be described with reference to the drawings.

Figure 22:
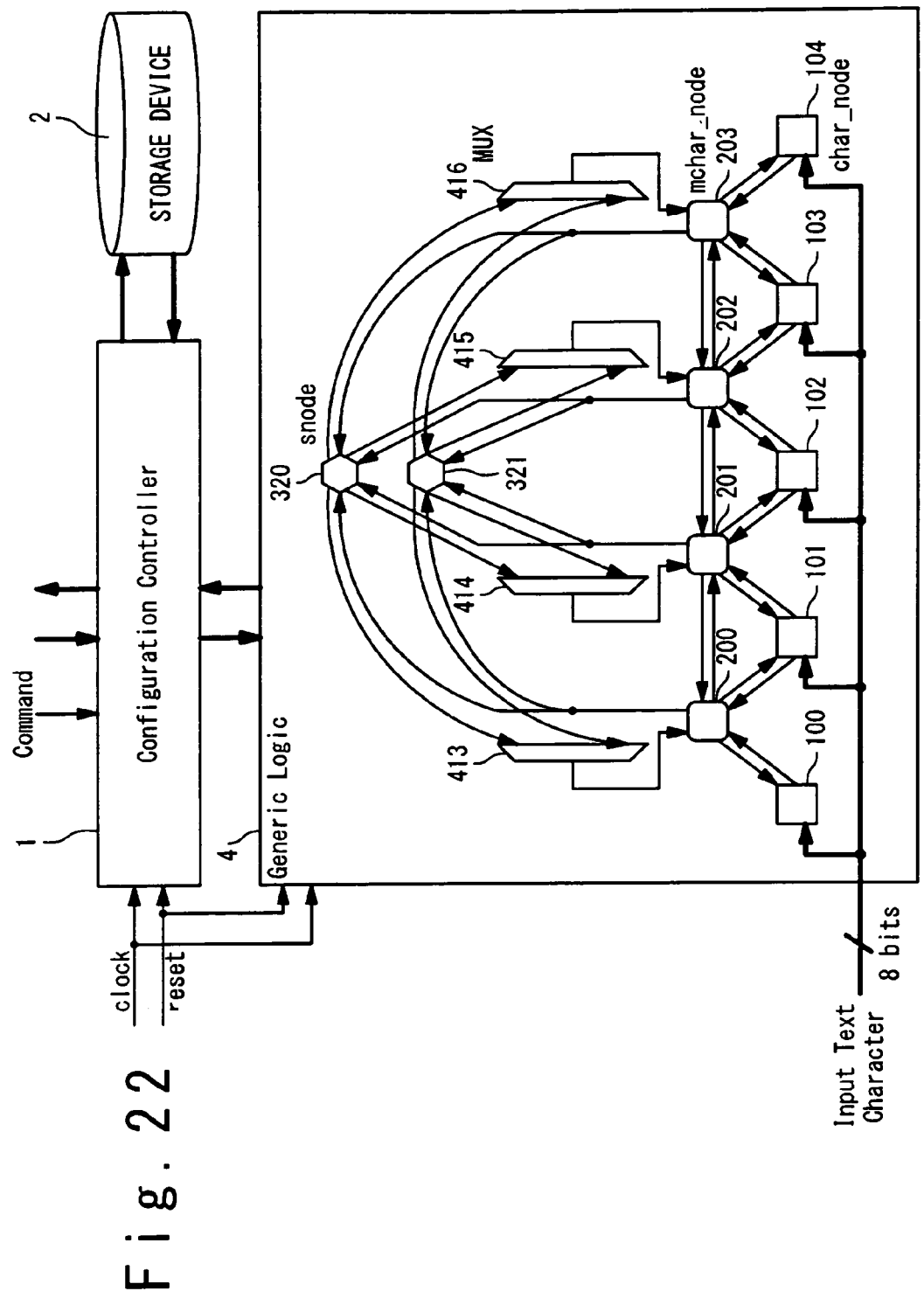
FIG. 22 is a block diagram describing a structure of a pattern matching apparatus according to a second exemplary embodiment of the present invention.

FIG. 22 is a block diagram describing a structure of a pattern matching apparatus according to the second exemplary embodiment of the present invention. The pattern matching apparatus according to the present exemplary embodiment and the pattern matching apparatus according to the first exemplary embodiment shown in FIG. 5 have the same configurations except for the generic logic 3 and the generic logic 4. Here, the generic logic 4 of the present exemplary embodiment is, similarly to the generic logic in the first exemplary embodiment, a reconfigurable finite automaton circuit which constitutes an arbitrary regular expression able to be expressed using a syntax tree based on the configuration data.

The generic logic 4 of the present exemplary embodiment is a reconfigurable finite automaton circuit which constitutes a finite automaton expressing a specific regular expression based on the configuration data set by the configuration controller 1. This has the configuration in which the binary tree configured by using the mchar_nodes and the snodes in the first exemplary embodiment is replaced by a M-ary tree and the other conditions are the same as those of the generic logic 3 according to the first exemplary embodiment. FIG. 22 shows an example of the generic logic configuring quadtrees which are reconfigurable.

Figure 23:
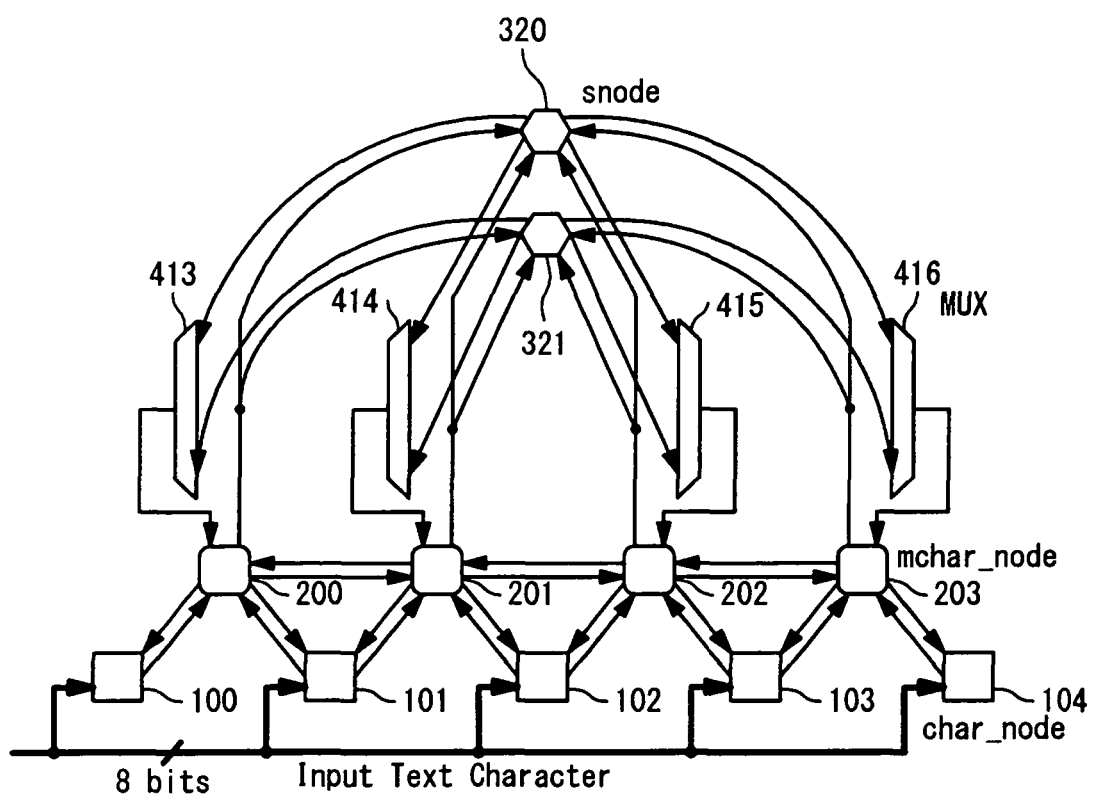
FIG. 23 is a block diagram describing a structure of the generic logic which can reconfigure quadtrees according to the second exemplary embodiment of the present invention.

FIG. 23 is a block diagram describing a structure of the generic logic which can reconfigure quadtrees according to the present exemplary embodiment. The generic logic 4 of the present exemplary embodiment has the configuration in which the 3-input-3-output switch nodes of the generic logic 3 of the first exemplary embodiment are replaced by 5-input-5-output switch nodes (snodes) 320, 321. The other conditions of the generic logic 4 of the present exemplary embodiment are the same as those of the generic logic 3 of the first exemplary embodiment. In the present embodiment, the binary trees configured by using the mchar_nodes and the snodes are configured by using M-ary trees in which M is an arbitrary natural number.

The snode configured as the M-ary tree according to the present exemplary embodiment is configured by using switches including (M+1) signal input sections and (M+1) signal output sections. As described in the first exemplary embodiment, this M-ary tree is, when respective nodes of the binary tree are arranged in line, a channel in the horizontal direction, which is necessary for correctly performing the connections. Therefore, the necessary number of the M-ary trees is equal to the necessary number of the binary trees according to the first exemplary embodiment. That is, the number of the channels of the M-ary tree depends on the number of the mchar_nodes: N in the generic logic 4 in spite of the value of M. The necessary number B is B=[$\log_2$(N+1)−1]×2. Here, the [x] is a minimum integer not less than x. Similarly to the necessary number of the binary tree according to the first exemplary embodiment, if the number of the mchar_nodes included in the generic logic is small, the necessary number may be the same as the number of the routing layers. Generally, the necessary number is the double of the number of the routing layers. In the case of the generic logic 4 with M=4 shown in FIGS. 22 and 23, only two quadtrees including the mchar_nodes as leaves nodes and the snodes as non-leaf nodes are shown. In this case, there is no case that a connection between certain mchar_nodes is performed by using the same connection signal between snodes in an identical binary tree. Therefore, practically, there is no problem if the number of the binary trees is 2. Generally, it is enough to provide the above B binary trees.

Figure 24:
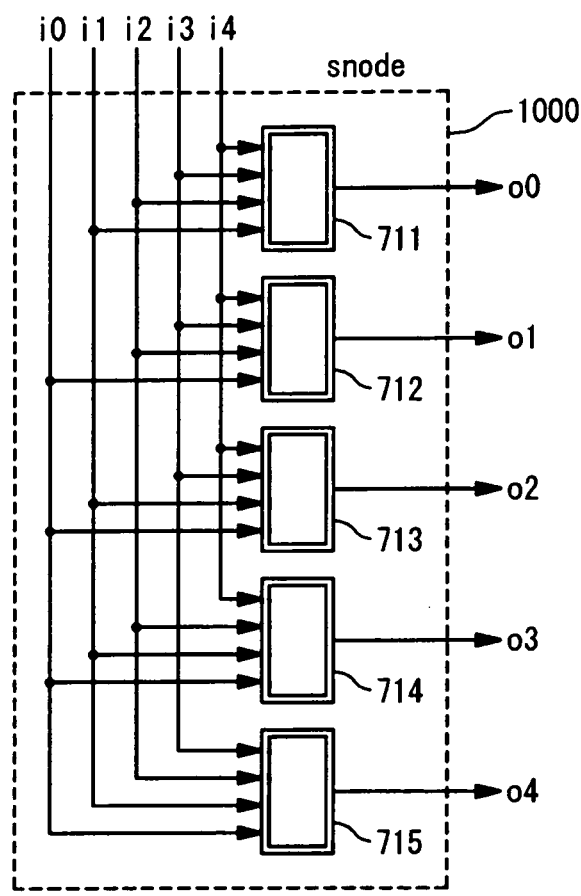
FIG. 24 is a circuit diagram describing a configuration example of a case that implementation is performed on the FPGA under a condition of M=4 in a snode with M+1 input and M+1 output.

FIG. 24 is a circuit diagram describing a configuration example of a case that implementation is performed on the FPGA under a condition of M=4 in a snode with M+1 input and M+1 output. The snode 1000 includes an i0 signal input section, an i1 signal input section, an i2 signal input section, an i3 signal input section, an i4 signal input section, five LUTs 711 to 715, an o0 output section, an o1 signal output section, an o2 signal output section, an o3 signal output section and an o4 signal output section. Each of the five LUTs 711 to 715 includes 4 input sections and one output section.

The 4 input sections of the LUT 711 are connected to the i1 signal input section, the i2 signal input section, the i3 signal input section and the i4 signal input section, respectively. The 4 input sections of the LUT 712 are connected to the i0 signal input section, the i2 signal input section, the i3 signal input section and the i4 signal input section, respectively. The 4 input sections of the LUT 713 are connected to the i0 signal input section, the i1 signal input section, the i3 signal input section and the i4 signal input section, respectively. The 4 input sections of the LUT 714 are connected to the i0 signal input section, the i1 signal input section, the i2 signal input section and the i4 signal input section, respectively. The 4 input sections of the LUT 715 are connected to the i0 signal input section, the i1 signal input section, the i2 signal input section and the i3 signal input section, respectively. The output sections of the LUTs 711 to 715 are connected to the o0 signal output section, the o1 signal output section, the o2 signal output section, the o3 signal output section and the o4 signal output section, respectively.

Each of the LUTs 711 to 715 selects one of four input signals based on the setting.

In addition, similarly to the first exemplary embodiment, the pattern matching apparatus according to the present exemplary embodiment is implemented on a chip as not an FPGA but exclusive hardware such as an ASIC. Even in this case, the configurations of the mchar_nodes, the char_nodes and the MUXs of the generic logic 4 are the same as those of the first exemplary embodiment. In addition, similarly to the first exemplary embodiment, it is enough that the snode has the configuration which can be changed by using the setting register group and rewriting its content based on the configuration data set by the configuration controller 1.

Next, the action and effect of the second exemplary embodiment of the present invention will be described.

Similarly to the first exemplary embodiment, the present exemplary embodiment can deal with a regular expression having more flexible expression.

In addition, in the present exemplary embodiment, if the M value of the M-ary tree is larger than 2, the increase amount of the snodes according to the increase of the number of the mchar_nodes is less than that of the first exemplary embodiment.

Generally, in the integer M equal to or more than 2 and the integer n equal to or more than 1, if the total amount of the leaf nodes of the M-ary is more than $M^{n-1}$ and equal to or less than $M^n$, the total amount of the non-leaf nodes is equal to or less than $(M^n-1)/(M-1)$. That is, in the pattern matching apparatus according to the present invention, if the total amount of the metacharacter node circuit sections is more than $M^{n-1}$ and equal to or less than $M^n$, the total amount of the switch node circuit sections of one M-ary tree is equal to or less than $(M^n-1)/(M-1)$. For example, let us suppose the generic logic which includes the mchar_nodes of which the number of the mchar_nodes is $2^{2n}$. In this case, the number of the snodes inside the channel block configured using the binary tree is $2^{2n}-1$, while the number of the snode inside the channel block configured using the quadtree is $(4^n-1)/3=(2^{2n}-1)/3$. That is, the necessary number of the snodes which are configured using the quadtree is one-third of the necessary number of the snodes which are configured using the binary tree. Consequently, in the present exemplary embodiment, as compared with the first exemplary embodiment, the increase of the hardware can be further suppressed.

The present invention can be applied to the field of a hardware circuit and a pattern matching apparatus for performing pattern matching processing using a regular expression at high speed in a hardware circuit and reconfiguring dynamically the regular expression.

In addition, the hardware circuits 3, 4 and the pattern matching apparatus using these circuits can be applied to the field of an off-load engine and acceleration in software-based pattern matching processing mounted on a personal computer and a workstation.

Furthermore, the present invention performs the pattern matching using the finite automaton and treats the example of the regular expression which can be expressed using the syntax tree such as the binary tree. However, according to the present invention, similarly, this can be applied to all of applications capable of performing pattern matching by expressed using the binary tree. The present invention can be applied to the fields of retrieval of an IP address in a communication device, retrieval of an IP address in an ACL (Access Control List), a retrieval of a port number and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-068011 filed on Mar. 19, 2009, the disclosure of which is incorporated herein in its entirety by reference.

The invention claimed is:

1. A pattern matching apparatus comprising:
    a configuration controller configuring configuration data with a certain format, which corresponds to an arbitrary regular expression combining characters as text characters and metacharacters having certain functional meanings; and
    an automaton circuit being realized by a hardware circuit, performing configuration, which is reconfigurable, corresponding to said regular expression by storing said configuration data in said hardware circuit, and being used for carrying out pattern matching to said regular expression,
    wherein said automaton circuit includes:
        character node circuit sections storing data corresponding to characters of said regular expression,
        metacharacter node circuit sections storing data corresponding to metacharacters of said regular expression and configure connection relations to said character node circuit sections by using said stored data, said metacharacter node circuit sections configuring connection relations to said other metacharacter node circuit sections by using said stored data, and switch node circuit sections configuring connection relations between metacharacter node circuit sections.

2. The pattern matching apparatus according to claim 1, wherein the total amount of said character node circuit sections is larger than the total amount of said metacharacter node circuit sections by one,
   wherein each of said character node circuit sections and each of said metacharacter node circuit sections are arranged alternately one by one in series,
   wherein each of said metacharacter node circuit sections is connected to two of said character node circuit sections adjacent to a left and right of said each metacharacter node circuit section, and
   wherein two of said metacharacter node circuit sections connected to an identical character node circuit section of said character node circuit sections are connected to each other.

3. The pattern matching apparatus according to claim 2, wherein said switch node circuit sections connect between said metacharacter node circuit sections except for two of said metacharacter node circuit sections connected to an identical character node circuit section of said character node circuit sections,
   wherein said connection relations in said switch node circuit sections have shapes of M-ary trees including said metacharacter node circuit sections as leaf nodes,
   wherein when the total number of said metacharacter node circuit sections is N, the total number of said M-ary trees is the double of a minimum integer which is not less than $\log_2(N+1)-1$.

4. The pattern matching apparatus according to claim 3, further comprising:
   multiplexer circuit sections being used for integrating a plurality of signals output toward an identical metacharacter node from different switch node circuit sections in said M-ray trees, and
   wherein each of said multiplexer circuit sections corresponds to one of said metacharacter node circuit sections one to one.

5. The pattern matching apparatus according to claim 4, wherein each of said metacharacter node circuit sections includes:
   five input sections receiving five input signals, respectively, from said corresponding multiplexer circuit section, a metacharacter node circuit section connected to the left side, a metacharacter node circuit section connected to the right side, a character node circuit section connected to the left side and a character node circuit section connected to the right side,
   five output sections outputting output signals, respectively, to said corresponding multiplexer circuit section, a metacharacter node circuit section connected to the left side, a metacharacter node circuit section connected to the right side, a character node circuit section connected to the left side and a character node circuit section connected to the right side, and
   five switch circuit sections connecting to said five output sections, respectively,
   wherein said five switch circuit sections output results of respective logic operations for said five input signals,
   wherein said configuration data includes setting values with respect to logic operations respectively performed by said five switch circuit sections.

6. The pattern matching apparatus according to claim 3, wherein when, in a certain integer n, the total number of said metacharacter node circuit sections is more than $M^{n-1}$ and equal to or less than ($M^n$, the total number of said switch node circuit sections of one of said M-ary trees is equal to or less than $(M^{n-1}-1)/(M-1)$.

7. The pattern matching apparatus according to claim 6, wherein each of said switch node circuit sections includes:
   (M+1) input sections receiving signals, respectively, from a previous stage switch node circuit section and M metacharacter node circuit sections or from a previous stage switch node circuit section and M later stage switch node circuit sections,
   (M+1) output sections outputting signals, respectively, to a previous stage switch node circuit section and MUXs corresponding to M metacharacter node circuit sections or to a previous stage switch node circuit section and M later stage switch node circuit sections, and
   (M+1) switch circuit sections connecting to said (M+1) output sections, respectively,
   wherein each of said (M+1) switch circuit sections selectively outputs one of input signals from circuit sections except for a circuit section which is connected to the corresponding output section, and
   wherein said configuration data includes setting values of selections respectively performed by said (M+1) switch circuit sections.

8. The pattern matching apparatus according to claim 6, wherein said M-ary trees comprise binary trees.

9. The pattern matching apparatus according to claim 6, wherein said M-ary trees comprise quadtrees.

10. The pattern matching apparatus according to claim 2, wherein each of said character node circuit sections comprises:
    a first input section receiving an output signal of a metacharacter node circuit section connected to the left side,
    a second input section receiving an output signal of a metacharacter node circuit section connected to the right side,
    a first switch circuit section selectively outputting one of a first input signal received by said first input section and a second input signal received by said second input section,
    a flip-flop circuit section storing an output signal of said first switch circuit section,
    a third input section receiving text character data for performing pattern matching,
    a comparator circuit section comparing said text character data with a character stored in said character node circuit section,
    a logical AND circuit section calculating logical AND between an output signal of the comparator circuit section and an output signal of the flip-flop circuit section,
    a second switch circuit section selectively outputting one of an output signal of said logical AND circuit section, said first input signal and said second input signal, and
    an output section outputting an output signal from said second switch circuit section,
    wherein said configuration data includes:
    a setting value of selection performed by said first switch circuit section,
    a setting value of selection performed by said second switch circuit section, and
    character data stored in said character node circuit section.

11. The pattern matching apparatus according to claim 2, wherein each of said character node circuit sections comprises:
    a first input section receiving an output signal of a metacharacter node circuit section connected to the left side, a second input section receiving an output signal of a metacharacter node circuit section connected to the right side, a first switch circuit section selectively outputting one of a first input signal received by said first input section, a second input signal received by said second input section and a third input signal, a flip-flop circuit section storing an output signal of said first switch circuit section, a third input section receiving text character data for performing pattern matching, a comparator circuit section comparing said text character data with a character stored in said character node circuit section, a logical AND circuit section calculating logical AND between an output signal of the comparator circuit section and an output signal of the flip-flop circuit section as said third signal, a second switch circuit section selectively outputting one of an output signal of said logical AND circuit section, said first input signal and said second input signal, and an output section outputting an output signal from said second switch circuit section, wherein said configuration data includes:

a setting value of selection performed by said first switch circuit section, a setting value of selection performed by said second switch circuit section, and character data stored in said character node circuit section.

12. The pattern matching apparatus according to claim 11, wherein said first switch circuit section includes:

a first memory circuit section storing a setting value for selecting one of said first input section and said second input section, a third switch circuit section selectively outputting one of said first input section and said second input section based on said setting value stored in said first memory circuit section, a second memory circuit section storing information regarding whether or not a character stored in said character node circuit section is merged with a metacharacter "*" indicating matching up 0 times or more, a logical AND circuit section calculating logical AND between said third signal and an output signal of said second memory circuit section, and a logical OR circuit section calculating logical OR between an output signal of said logical AND circuit section and an output signal of said third switch circuit section to output toward said flip-flop circuit section, wherein said second switch circuit section includes:

a third memory circuit section storing a setting value of selection performed by said second switch circuit section and connecting to said second switch circuit section, and wherein said pattern matching apparatus further comprising:

a fourth memory circuit section storing data of a character stored in the character node circuit section and connecting to said comparator circuit section.

13. The pattern matching apparatus according to claim 1, further comprising:

a storage device connecting to said configuration controller and storing said configuration data.

14. An automaton circuit in a pattern matching apparatus, wherein said pattern matching apparatus includes:

a configuration controller configuring configuration data with a certain format, which corresponds to an arbitrary regular expression combining characters as text characters and metacharacters having certain functional meanings, and said automaton circuit being realized by a hardware circuit, performing configuration, which is reconfigurable, corresponding to said regular expression by storing said configuration data in said hardware circuit, and being used for carrying out pattern matching to said regular expression, said automaton circuit comprising:

character node circuit sections storing data corresponding to characters of said regular expression;

metacharacter node circuit sections storing data corresponding to metacharacters of said regular expression and configure connection relations to said character node circuit sections by using said stored data, said metacharacter node circuit sections configuring connection relations to said other metacharacter node circuit sections by using said stored data; and switch node circuit sections configuring connection relations between metacharacter node circuit sections.

15. A pattern matching method comprising:

(a) configuring configuration data with a certain format, which corresponds to an arbitrary regular expression combining characters as text characters and metacharacters having certain functional meanings;

(α) performing configuration corresponding to said regular expression to an automaton circuit, which is realized by a hardware circuit, by storing said configuration data in a reconfigurable manner; and (b) carrying out pattern matching using said automaton circuit, wherein said (a) includes:

(a-1) in character node circuit sections of said automaton circuit, storing data corresponding to characters of said regular expression, (a-2) in metacharacter node circuit sections of said automaton circuit, storing data corresponding to metacharacters of said regular expression and configuring connection relations to said character nodes or the other metacharacter nodes by using said stored data, and (a-3) in a switch node circuit section of said automaton circuit, configuring connection relations between said metacharacter nodes.

16. The automaton circuit according to claim 14, wherein the total amount of said character node circuit sections is larger than the total amount of said metacharacter node circuit sections by one, wherein each of said character node circuit sections and each of said metacharacter node circuit sections are arranged alternately one by one in series, wherein each of said metacharacter node circuit sections is connected to two of said character node circuit sections adjacent to a left and right of said each metacharacter node circuit section, and wherein two of said metacharacter node circuit sections connected to an identical character node circuit section of said character node circuit sections are connected to each other.

17. The automaton circuit according to claim 16, wherein said switch node circuit sections connect between said metacharacter node circuit sections except for two of said metacharacter node circuit sections connected to an identical character node circuit section of said character node circuit sections, wherein said connection relations in said switch node circuit sections have shapes of M-ary trees including said metacharacter node circuit sections as leaf nodes, wherein when the total number of said metacharacter node circuit sections is N, the total number of said M-ary trees is the double of a minimum integer which is not less than $\log_2(N+1)-1$.

18. The automaton circuit according to claim 17, further comprising:

multiplexer circuit sections being used for integrating a plurality of signals output toward an identical metacharacter node from different switch node circuit sections in said M-ray trees, and wherein each of said multiplexer circuit sections corresponds to one of said metacharacter node circuit sections one to one.

19. The automaton circuit according to claim 18, wherein each of said metacharacter node circuit sections includes:

five input sections receiving five input signals, respectively, from said corresponding multiplexer circuit section, a metacharacter node circuit section connected to the left side, a metacharacter node circuit section connected to the right side, a character node circuit section connected to the left side and a character node circuit section connected to the right side, five output sections outputting output signals, respectively, to said corresponding multiplexer circuit section, a metacharacter node circuit section connected to the left side, a metacharacter node circuit section connected to the right side, a character node circuit section connected to the left side and a character node circuit section connected to the right side, and five switch circuit sections connecting to said five output sections, respectively, wherein said five switch circuit sections output results of respective logic operations for said five input signals, wherein said configuration data includes setting values with respect to logic operations respectively performed by said five switch circuit sections.

20. The automaton circuit according to claim 17, wherein when, in a certain integer n, the total number of said metacharacter node circuit sections is more than $M^{n-1}$ and equal to or less than $M^n$, the total number of said switch node circuit sections of one of said M-ary trees is equal to or less than $(M^n-1)/(M-1)$.

21. The automaton circuit according to claim 20, wherein each of said switch node circuit sections includes:

(M+1) input sections receiving signals, respectively, from a previous stage switch node circuit section and M metacharacter node circuit sections or from a previous stage switch node circuit section and M later stage switch node circuit sections, (M+1) output sections outputting signals, respectively, to a previous stage switch node circuit section and MUXs corresponding to M metacharacter node circuit sections or to a previous stage switch node circuit section and M later stage switch node circuit sections, and (M+1) switch circuit sections connecting to said (M+1) output sections, respectively, wherein each of said (M+1) switch circuit sections selectively outputs one of input signals from circuit sections except for a circuit section which is connected to the corresponding output section, and wherein said configuration data includes setting values of selections respectively performed by said (M+1) switch circuit sections.

22. The automaton circuit according to claim 20, wherein said M-ary trees comprise binary trees.

23. The automaton circuit according to claim 20, wherein said M-ary trees comprise quadtrees.

24. The automaton circuit according to claim 16, wherein each of said character node circuit sections:

a first input section receiving an output signal of a metacharacter node circuit section connected to the left side, a second input section receiving an output signal of a metacharacter node circuit section connected to the right side, a first switch circuit section selectively outputting one of a first input signal received by said first input section and a second input signal received by said second input section, a flip-flop circuit section storing an output signal of said first switch circuit section, a third input section receiving text character data for performing pattern matching, a comparator circuit section comparing said text character data with a character stored in said character node circuit section, a logical AND circuit section calculating logical AND between an output signal of the comparator circuit section and an output signal of the flip-flop circuit section, a second switch circuit section selectively outputting one of an output signal of said logical AND circuit section, said first input signal and said second input signal, and an output section outputting an output signal from said second switch circuit section, wherein said configuration data includes:

a setting value of selection performed by said first switch circuit section, a setting value of selection performed by said second switch circuit section, and character data stored in said character node circuit section.

25. The automaton circuit according to claim 16, wherein each of said character node circuit sections comprises:

a first input section receiving an output signal of a metacharacter node circuit section connected to the left side, a second input section receiving an output signal of a metacharacter node circuit section connected to the right side, a first switch circuit section selectively outputting one of a first input signal received by said first input section, a second input signal received by said second input section and a third input signal, a flip-flop circuit section storing an output signal of said first switch circuit section, a third input section receiving text character data for performing pattern matching, a comparator circuit section comparing said text character data with a character stored in said character node circuit section, a logical AND circuit section calculating logical AND between an output signal of the comparator circuit section and an output signal of the flip-flop circuit section as said third signal, a second switch circuit section selectively outputting one of an output signal of said logical AND circuit section, said first input signal and said second input signal, and an output section outputting an output signal from said second switch circuit section, wherein said configuration data includes:
a setting value of selection performed by said first switch circuit section,
a setting value of selection performed by said second switch circuit section, and
character data stored in said character node circuit section.

26. The automaton circuit according to claim 25, wherein said first switch circuit section includes:
- a first memory circuit section storing a setting value for selecting one of said first input section and said second input section, a third switch circuit section selectively outputting one of said first input section and said second input section based on said setting value stored in said first memory circuit section,
- a second memory circuit section storing information regarding whether or not a character stored in said character node circuit section is merged with a metacharacter "*" indicating matching up 0 times or more,
- a logical AND circuit section calculating logical AND between said third signal and an output signal of said second memory circuit section, and
- a logical OR circuit section calculating logical OR between an output signal of said logical AND circuit section and an output signal of said third switch circuit section to output toward said flip-flop circuit section, wherein said second switch circuit section includes:
a third memory circuit section storing a setting value of selection performed by said second switch circuit section and connecting to said second switch circuit section, and wherein said pattern matching apparatus further comprising:
a fourth memory circuit section storing data of a character stored in the character node circuit section and connecting to said comparator circuit section.

* * * * *